(12) United States Patent
Hasegawa et al.

(10) Patent No.: US 11,156,904 B2
(45) Date of Patent: Oct. 26, 2021

(54) IMAGING DEVICE AND CONTROL METHOD THEREOF

(71) Applicant: FUJIFILM Corporation, Tokyo (JP)

(72) Inventors: Yuji Hasegawa, Saitama (JP); Satoru Wakabayashi, Saitama (JP); Shunta Ego, Saitama (JP); Takeshi Misawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 284 days.

(21) Appl. No.: 16/234,610

(22) Filed: Dec. 28, 2018

(65) Prior Publication Data
US 2019/0129282 A1    May 2, 2019

Related U.S. Application Data

(63) Continuation of application No. PCT/JP2017/023582, filed on Jun. 27, 2017.

(30) Foreign Application Priority Data

Jun. 30, 2016 (JP) .............................. JP2016-130418

(51) Int. Cl.
*G03B 7/097* (2021.01)
*H04N 5/232* (2006.01)
(Continued)

(52) U.S. Cl.
CPC .............. *G03B 17/20* (2013.01); *G03B 7/093* (2013.01); *G03B 7/097* (2013.01); *G03B 15/03* (2013.01);
(Continued)

(58) Field of Classification Search
CPC .............. G03B 7/093–097; G03B 7/20; H04N 5/232933; H04N 5/232939
See application file for complete search history.

(56) References Cited

U.S. PATENT DOCUMENTS

2003/0071908 A1* 4/2003 Sannoh .............. H04N 5/23293
                                                      348/345
2006/0269261 A1* 11/2006 Wernersson ......... H04N 5/2352
                                                      396/55
(Continued)

FOREIGN PATENT DOCUMENTS

JP    2003274268    9/2003
JP    2005037967    2/2005
(Continued)

OTHER PUBLICATIONS

"International Search Report (Form PCT/ISA/210) of PCT/JP2017/023582," dated Sep. 19, 2017, with English translation thereof, pp. 1-3.
(Continued)

*Primary Examiner* — Jeremiah C Hallenbeck-Huber
(74) *Attorney, Agent, or Firm* — JCIPRNET

(57) ABSTRACT

A camera main body includes a mount, a solid-state imaging element, a main body controller, a card I/F, an accessory information storage section, a rear surface display section, and a finder section. An interchangeable lens is attached to the mount. A setting menu is displayed on the rear surface display section. The main body controller extracts accessory information including an imaging time point in a specific time slot from a plurality of pieces of accessory information read out from a memory card by the card I/F. Further, the main body controller changes a setting menu in accordance with imaging conditions included in accessory information that is extracted as the accessory information including the imaging time point in the specific time slot and is stored in the accessory information storage section.

20 Claims, 21 Drawing Sheets

| ACCESSORY INFORMATION (IMAGING TIME POINT 06:00 TO 10:00) | EXPOSURE CORRECTION | FLASH MODE | ISO SENSITIVITY | ... |
|---|---|---|---|---|
| IMAGING CONDITION 1 | 0 | AUTO | 3200 | ... |
| IMAGING CONDITION 4 | -1 | FLASH ON | 3200 | ... |
| IMAGING CONDITION 5 | 0 | FLASH ON | 800 | ... |
| IMAGING CONDITION 6 | +1 | FLASH ON | 800 | ... |
| IMAGING CONDITION 8 | +1 | FLASH ON | 800 | ... |
| IMAGING CONDITION 10 | 0 | FLASH ON | 800 | ... |
| IMAGING CONDITION 11 | +1/3 | FLASH ON | 800 | ... |
| IMAGING CONDITION 15 | +1/3 | FLASH OFF | 800 | ... |
| IMAGING CONDITION 16 | 0 | AUTO | 800 | ... |
| IMAGING CONDITION 20 | +1 | AUTO | 800 | ... |
| NUMBER OF CHANGES | 7 | 3 | 1 | 0 |
| MOST FREQUENTLY USED SETTING VALUE | +1 | FLASH ON | 800 | |

(51) Int. Cl.
*G03B 17/20* (2021.01)
*G03B 15/03* (2021.01)
*G03B 17/18* (2021.01)
*H04N 5/235* (2006.01)
*G06T 7/50* (2017.01)
*G03B 7/093* (2021.01)

(52) U.S. Cl.
CPC ............... *G03B 17/18* (2013.01); *G06T 7/50* (2017.01); *H04N 5/2354* (2013.01); *H04N 5/23212* (2013.01); *H04N 5/23219* (2013.01); *H04N 5/232933* (2018.08); *H04N 5/232939* (2018.08); *G06T 2207/30201* (2013.01)

(56) References Cited

U.S. PATENT DOCUMENTS

| | | | | |
|---|---|---|---|---|
| 2008/0192129 | A1* | 8/2008 | Walker | G11B 27/34 348/231.2 |
| 2009/0174786 | A1* | 7/2009 | Joseph | H04N 5/23222 348/222.1 |
| 2010/0079644 | A1* | 4/2010 | Tamura | H04N 5/3532 348/302 |
| 2011/0050909 | A1* | 3/2011 | Ellenby | G03B 17/24 348/207.1 |
| 2011/0216209 | A1* | 9/2011 | Fredlund | G06F 3/017 348/211.99 |
| 2011/0292221 | A1* | 12/2011 | Gu | H04N 5/23222 348/207.1 |
| 2013/0027571 | A1* | 1/2013 | Parulski | H04N 5/23219 348/207.11 |
| 2013/0050507 | A1* | 2/2013 | Syed | H04N 5/23222 348/207.1 |
| 2016/0006922 | A1* | 1/2016 | Boudreau | G01S 7/022 348/207.1 |
| 2016/0080643 | A1* | 3/2016 | Kimura | H04N 5/2628 348/207.1 |
| 2016/0261794 | A1* | 9/2016 | Knodt | H04N 5/23222 |
| 2018/0316853 | A1* | 11/2018 | Liang | G03B 19/00 |

FOREIGN PATENT DOCUMENTS

| | | |
|---|---|---|
| JP | 2005347985 | 12/2005 |
| JP | 2010050552 | 3/2010 |

OTHER PUBLICATIONS

"Written Opinion of the International Searching Authority (Form PCT/ISA/237) of PCT/JP2017/023582," dated Sep. 19, 2017, with English translation thereof, pp. 1-7.

* cited by examiner

FIG. 7

| IMAGING SCENE | AUTO |
| --- | --- |
| | PERSON |
| | LANDSCAPE |
| | SPORT |
| | NIGHT SCENE |

FIG. 8

| FOCUS MODE | AF-S (SINGLE AF) |
| --- | --- |
| | AF-C (CONTINUOUS AF) |
| | MF (MANUAL FOCUS) |

FIG. 9

| IMAGE SIZE | L 3:2 |
|---|---|
| | L 16:9 |
| | L 1:1 |
| | M 3:2 |
| | M 16:9 |
| | M 1:1 |
| | S 3:2 |
| | S 16:9 |
| | S 1:1 |

FIG. 11

| ACCESSORY INFORMATION (IMAGING TIME POINT 06:00 TO 10:00) | EXPOSURE CORRECTION | FLASH MODE | ISO SENSITIVITY | ... |
|---|---|---|---|---|
| IMAGING CONDITION 1 | 0 | AUTO | 3200 | ... |
| IMAGING CONDITION 4 | -1 | FLASH ON | 3200 | ... |
| IMAGING CONDITION 5 | 0 | FLASH ON | 800 | ... |
| IMAGING CONDITION 6 | +1 | FLASH ON | 800 | ... |
| IMAGING CONDITION 8 | +1 | FLASH ON | 800 | ... |
| IMAGING CONDITION 10 | 0 | FLASH ON | 800 | ... |
| IMAGING CONDITION 11 | +1/3 | FLASH ON | 800 | ... |
| IMAGING CONDITION 15 | +1/3 | FLASH OFF | 800 | ... |
| IMAGING CONDITION 16 | 0 | AUTO | 800 | ... |
| IMAGING CONDITION 20 | +1 | AUTO | 800 | ... |
| NUMBER OF CHANGES | 7 | 3 | 1 | 0 |
| MOST FREQUENTLY USED SETTING VALUE | +1 | FLASH ON | 800 | |

M1 SETTING MENU  1/10

| IMAGING SCENE | LANDSCAPE |
|---|---|
| FOCUS MODE | AF-S |
| IMAGE SIZE | L 3:2 |
| ISO SENSITIVITY | 800 |
| EXPOSURE CORRECTION | +1/3 |
| FLASH MODE | AUTO |

NEXT PAGE

M2 SETTING MENU  1/10

| EXPOSURE CORRECTION | +1 |
|---|---|
| FLASH MODE | FLASH ON |
| ISO SENSITIVITY | 800 |
| IMAGING SCENE | LANDSCAPE |
| FOCUS MODE | AF-S |
| IMAGE SIZE | L 3:2 |

NEXT PAGE

FIG. 23

| ACCESSORY INFORMATION (IMAGING TIME POINT 06:00 TO 10:00) | IMAGING SCENE | FLASH MODE |
|---|---|---|
| IMAGING CONDITION 1 | LANDSCAPE | FLASH OFF |
| IMAGING CONDITION 4 | LANDSCAPE | FLASH OFF |
| IMAGING CONDITION 5 | LANDSCAPE | FLASH OFF |
| IMAGING CONDITION 6 | LANDSCAPE | FLASH OFF |
| IMAGING CONDITION 8 | LANDSCAPE | FLASH OFF |
| IMAGING CONDITION 10 | LANDSCAPE | FLASH OFF |
| IMAGING CONDITION 11 | LANDSCAPE | AUTO |
| IMAGING CONDITION 15 | PERSON | AUTO |
| IMAGING CONDITION 16 | PERSON | AUTO |
| IMAGING CONDITION 20 | PERSON | AUTO |

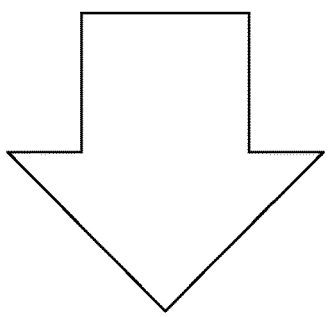

| | | FLASH MODE | |
| --- | --- | --- | --- |
| | | FLASH OFF | AUTO |
| IMAGING SCENE SELECTION | LANDSCAPE | 6 | 1 |
| | PERSON | 0 | 3 |

IMAGING DEVICE AND CONTROL METHOD THEREOF

CROSS-REFERENCE TO RELATED APPLICATIONS

This application is a Continuation of PCT International Application No. PCT/JP2017/023582 filed on 27 Jun. 2017, which claims priority under 35 U.S.C § 119(a) to Japanese Patent Application No. 2016-130418 filed on 30 Jun. 2016. The above application is hereby expressly incorporated by reference, in its entirety, into the present application.

BACKGROUND OF THE INVENTION

1. Field of the Invention

The present invention relates to an imaging device that reads out accessory information of a captured image and a control method thereof.

2. Description of the Related Art

As an imaging device such as a digital camera, there is an imaging device that has a variety of imaging functions in order to capture a high-quality image. As such an imaging device, a configuration in which a setting menu is displayed on a display section and an imaging function can be set on the basis of the setting menu has been generally used.

In the related art, an imaging device comprises a reading section that reads out information from a memory card or an external storage section, and the reading section reads out a captured image stored in the storage section and accessory information attached to the captured image. JP2010-050552A discloses an imaging device that reads out imaging conditions included in accessory information and changes a setting menu on the basis of the imaging conditions.

SUMMARY OF THE INVENTION

However, in the imaging device disclosed in JP JP2010-050552A, there is a case where a setting item for setting an imaging function that a user wants to use is not displayed. Particularly, in a case where a current time point when a user performs imaging and an imaging time point included in the imaging conditions read out from a storage section are different from each other, a setting item different from a current situation is displayed as the setting menu, and thus, usability becomes poor.

An object of the invention is to provide an imaging device capable of appropriately changing display content of a setting menu in accordance with an imaging time point and a control method thereof.

According to an aspect of the invention, there is provided an imaging device comprising: an imaging section; a reading section; a menu display section; an accessory information extraction section; and a menu change section. The imaging section captures a subject image. The reading section reads out a plurality of captured images stored in a storage section and accessory information that is attached to the plurality of captured images and includes an imaging condition and an imaging time point. The menu display section displays a setting menu for setting an imaging function of the imaging section. The accessory information extraction section extracts the accessory information including the imaging time point in a specific time slot from a plurality of pieces of the accessory information read out from the reading section. The menu change section changes the setting menu in accordance with the imaging condition included in the accessory information extracted by the accessory information extraction section.

It is preferable that the menu display section displays a plurality of display setting items selected from a plurality of setting items corresponding to the imaging condition as the setting menu, and the menu change section changes the display setting item to be displayed as the setting menu in accordance with the imaging condition included in the accessory information extracted by the accessory information extraction section.

It is preferable that the imaging device further comprises a current time point acquisition section that acquires a current time point and the specific time slot is a time slot including the current time point acquired by the current time point acquisition section.

It is preferable that the specific time slot is a time slot within a predetermined time range before and after the current time point, including the current time point acquired by the current time point acquisition section.

It is preferable that the imaging device further comprises a daytime/nighttime slot determination section that determines whether the current time point acquired by the current time point acquisition section is a daytime slot or a nighttime slot and the specific time slot is any one of the daytime slot or the nighttime slot determined by the daytime/nighttime slot determination section.

It is preferable that the imaging device further comprises a daytime/nighttime slot determination section that determines whether the current time point acquired by the current time point acquisition section is a daytime slot or a nighttime slot and the specific time slot is a time slot within a predetermined time range including the current time point acquired by the current time point acquisition section and is a time slot included in any one of the daytime slot or the nighttime slot determined by the daytime/nighttime slot determination section.

It is preferable that the imaging device further comprises a daytime/nighttime slot determination section that determines whether the current time point acquired by the current time point acquisition section is a daytime slot or a nighttime slot and the accessory information extraction section extracts the accessory information including the imaging time point in any one of the daytime slot or the nighttime slot determined by the daytime/nighttime slot determination section in a case where the accessory information including the imaging time point in the specific time slot is not present.

It is preferable that the imaging device further comprises a position information acquisition section that acquires information on a current position and the accessory information extraction section extracts the accessory information relating to the position information acquired by the position information acquisition section in a case where the accessory information including the imaging time point in the specific time slot is not present.

It is preferable that the imaging device further comprises a face image detection section that detects a face image from the subject image captured by the imaging section and the accessory information extraction section extracts the accessory information relating to person imaging in a case where the accessory information including the imaging time point in the specific time slot is not present and the face image is detected by the face image detection section, and extracts the accessory information relating to non-person imaging in a case where the accessory information including the imaging time point in the specific time slot is not present and the face image is not detected by the face image detection section.

It is preferable that the menu change section counts the number of changes of the imaging condition used in imaging in the specific time slot for each display setting item on the basis of the imaging condition included in the accessory information extracted by the accessory information extraction section, and displays the display setting items in a descending order of the numbers of changes.

It is preferable that the imaging device further comprises a setting value determination section that determines setting values of the plurality of display setting items, and determines values most frequently used in the display setting items as the setting values, on the basis of the imaging condition included in the accessory information extracted by the accessory information extraction section.

It is preferable that the imaging device further comprises: an exposure value detection section that detects an exposure value in the subject image captured by the imaging section; a flash light emission controller that controls, in a case where there is a flash device that irradiates a subject with illumination light, light emission of the flash device; and a setting value determination section that changes, in a case where an exposure value that is equal to or larger than a predetermined value is detected by the exposure value detection section, the exposure value to a setting value for reducing the quantity of light emission of the flash device, and changes, in a case where an exposure value that is smaller than the predetermined value is detected by the exposure value detection section, the exposure value to a setting value for increasing the quantity of light emission of the flash device.

It is preferable that the imaging device further comprises an exposure value detection section; a flash light emission controller; and a setting value determination section that changes, in a case where an exposure value that is equal to or larger than a predetermined value is detected by the exposure value detection section, the exposure value to a setting value for turning off light emission of the flash device, and changes, in a case where an exposure value that is smaller than the predetermined value is detected by the exposure value detection section, the exposure value to a setting value for turning on light emission of the flash device.

It is preferable that the imaging device further comprises: an exposure value detection section; a flash light emission controller; and a setting value determination section that changes, in a case where the face image is detected by the face image detection section and an exposure value that is equal to or larger than a predetermined value is detected by the exposure value detection section, the exposure value to a setting value for turning off light emission of the flash device, and changes, in a case where the face image is detected by the face image detection section and an exposure value that is smaller than the predetermined value is detected by the exposure value detection section, the exposure value to a setting value for turning on light emission of the flash device.

It is preferable that the imaging device further comprises: a distance calculation section that calculates a distance value to a subject in the subject image captured by the imaging section; a flash light emission controller; and a setting value determination section that changes, in a case where the face image is not detected by the face image detection section and a distance value that is equal to or larger than a predetermined value is detected by the distance calculation section, the distance value to a setting value for turning off light emission of the flash device, and changes, in a case where the face image is not detected by the face image detection section and a distance value that is smaller than the predetermined value is detected by the distance calculation section, the distance value to a setting value for turning on light emission of the flash device.

It is preferable that the setting value determination section determines a setting value with respect to a specific first setting item among the plurality of display setting items on the basis of the imaging condition included in the accessory information extracted by the accessory information extraction section, and determines a setting value with respect to a second setting item relating to the first setting item among the plurality of display setting items different from the first setting item on the basis of the imaging condition included in the accessory information corresponding to the setting value determined with respect to the first setting item.

It is preferable that the storage section is a storage medium. Alternatively, it is preferable that the storage section is an online storage. Further, it is preferable that in a case where there is a plurality of the storage sections, the accessory information extraction section re-arranges the accessory information that is extracted as the accessory information including the imaging time point in the specific time slot in a time series manner.

It is preferable that the menu change section changes the setting menu in accordance with a plurality of pieces of the accessory information used in imaging in a predetermined period, among the plurality of pieces of the accessory information that are re-arranged in a time series manner by the accessory information extraction section. Further, it is preferable that the accessory information is formed of EXIF format data.

According to another aspect of the invention, there is provided an imaging device control method comprising: a step of reading out a plurality of captured images stored in a storage section and accessory information that is attached to the plurality of captured images and includes an imaging condition and an imaging time point; a step of displaying a setting menu for setting an imaging function of an imaging section; a step of extracting the accessory information including the imaging time point in a specific time slot from a plurality of pieces of the accessory information; and a step of changing the setting menu in accordance with the imaging condition included in the accessory information including the imaging time point in the specific time slot.

According to the invention, it is possible to appropriately change display content of a setting menu in accordance with an imaging time point.

BRIEF DESCRIPTION OF THE DRAWINGS

FIG. 7 is a diagram illustrating a display screen showing a selection candidate list in a case where a display setting item of an imaging scene is selected from the setting menu.

FIG. 8 is a diagram illustrating a display screen showing a selection candidate list in a case where a display setting item of a focus mode is selected from the setting menu.

FIG. 9 is a diagram illustrating a display screen showing a selection candidate list in a case where a display setting item of an image size is selected from the setting menu.

FIG. 11 is a diagram illustrating a configuration in which the number of changes of imaging conditions used in imaging in a specific time slot is counted.

FIG. 23 is a diagram illustrating an example of accessory information extracted from a plurality of pieces of accessory information read out from a storage section according to a seventh embodiment.

DESCRIPTION OF THE PREFERRED EMBODIMENTS

First Embodiment

Figure 1:
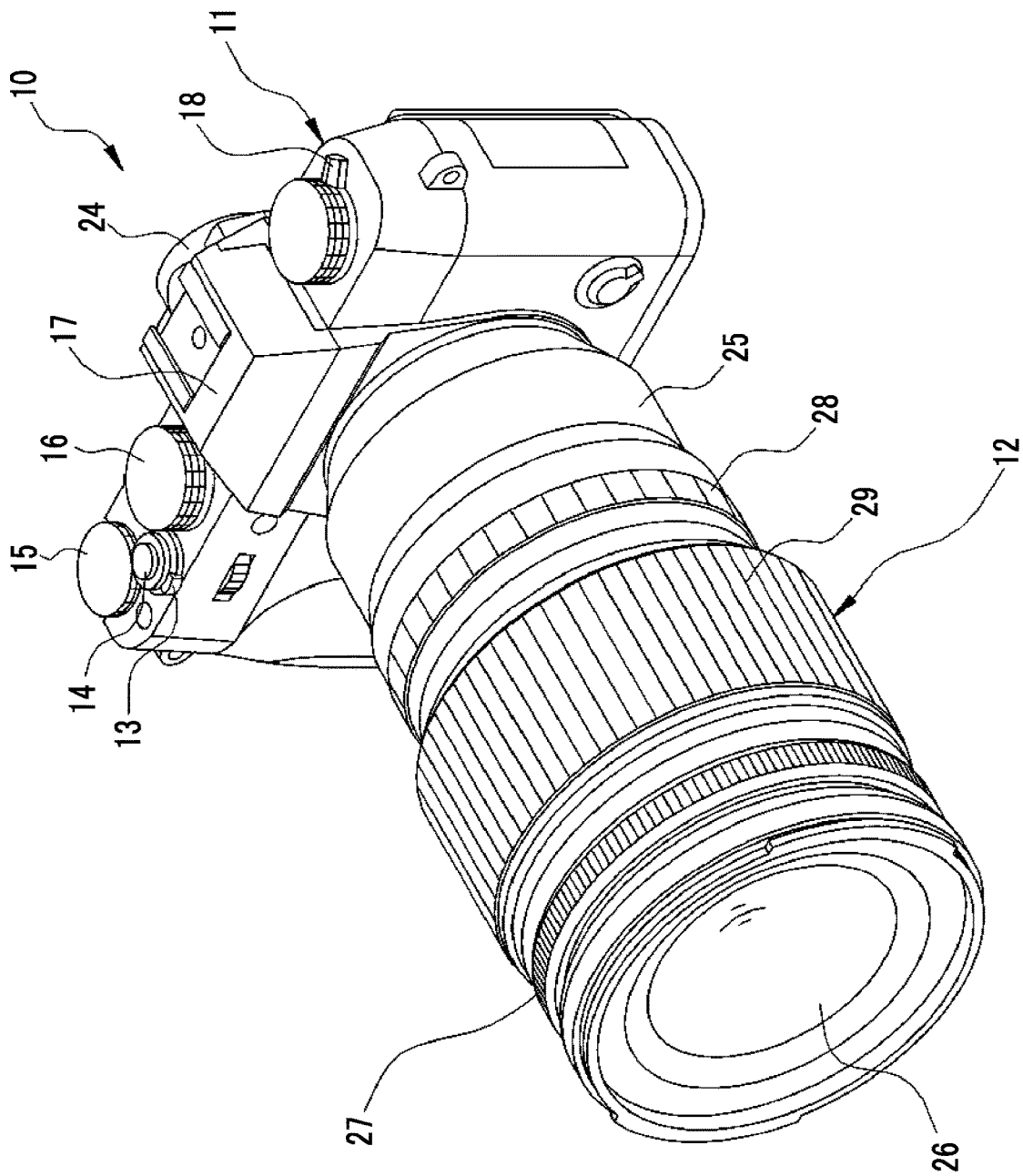
FIG. 1 is a perspective view showing a front side appearance of an interchangeable lens type digital camera.
Figure 2:
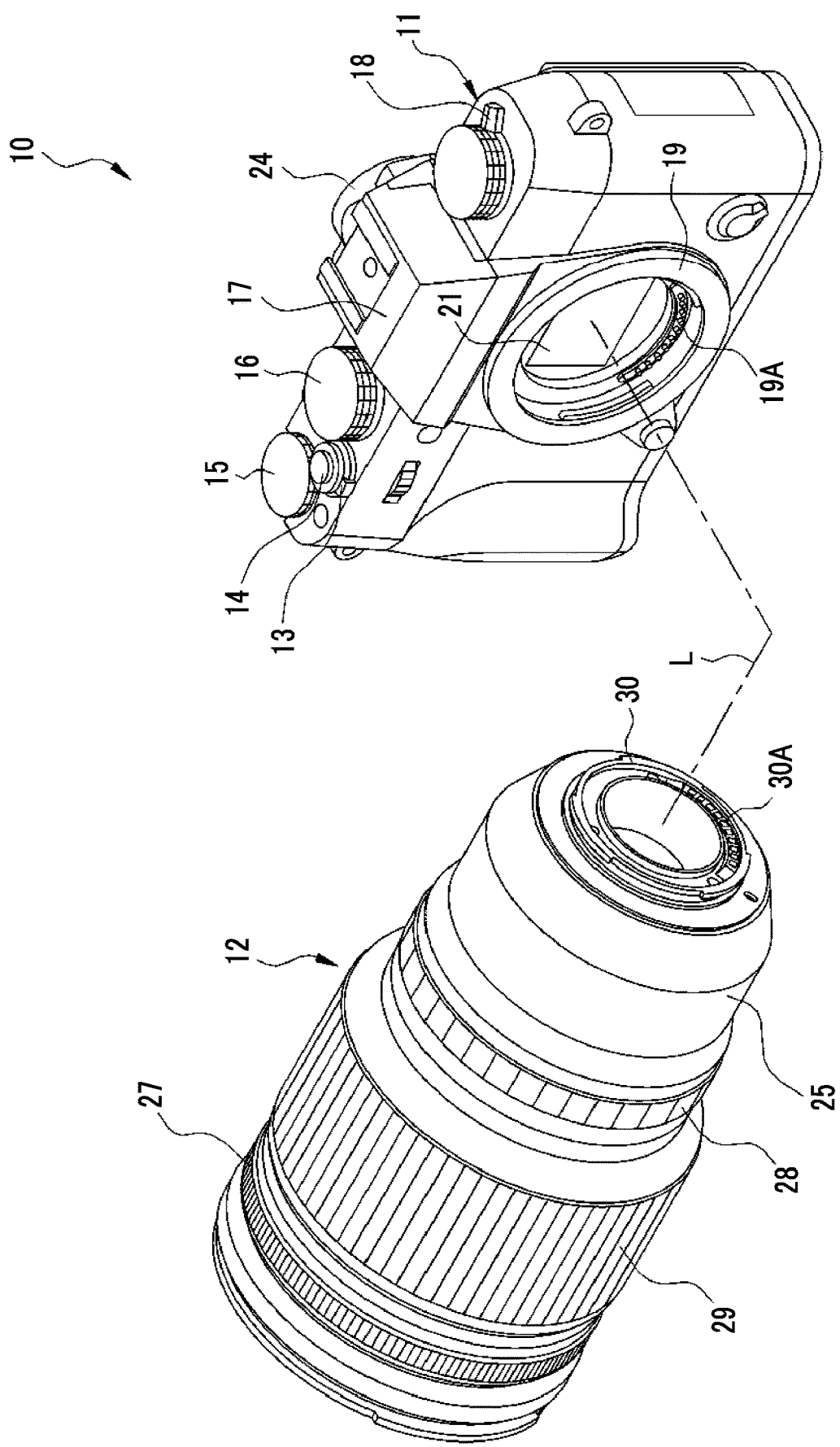
FIG. 2 is a perspective view showing an appearance of an interchangeable lens and a camera main body.

Referring to FIGS. 1 and 2, an interchangeable lens type digital camera (hereinafter, referred to as a camera) 10 comprises a camera main body 11 and an interchangeable lens 12. The camera 10 is a so-called mirrorless single-lens type digital camera.

The camera main body 11 comprises a power source lever 13, a release switch 14, an exposure correction dial 15, a shutter speed/ISO sensitivity dial 16, a built-in flash device (hereinafter, referred to as a flash device) 17, and the like on an upper surface thereof.

The release switch 14 is a two-stage stroke switch capable of performing so-called "half-push" and "full-push". The release switch 14 outputs an S1 ON signal by being half pushed, and outputs an S2 ON signal by being fully pushed from the half-push. The camera 10 executes an imaging preparation process such as an auto focus adjustment (AF process) or an auto exposure control in a case where the S1 ON signal is output from the release switch 14, and executes an imaging process in a case where the S2 ON signal is output. The flash device 17 is configured so that a cover is opened as a flash lever 18 is operated, for example, to expose a light emitting section. The flash device 17 irradiates a subject with illumination light under the control of a main body controller 50 (which will be described later).

On a front surface of the camera main body 11, a mount 19 is provided. The interchangeable lens 12 is attached to the mount 19. Inside the mount 19, a body side signal contact 19A for being electrically connected to the interchangeable lens 12 and a solid-state imaging element 21 are provided.

Figure 3:
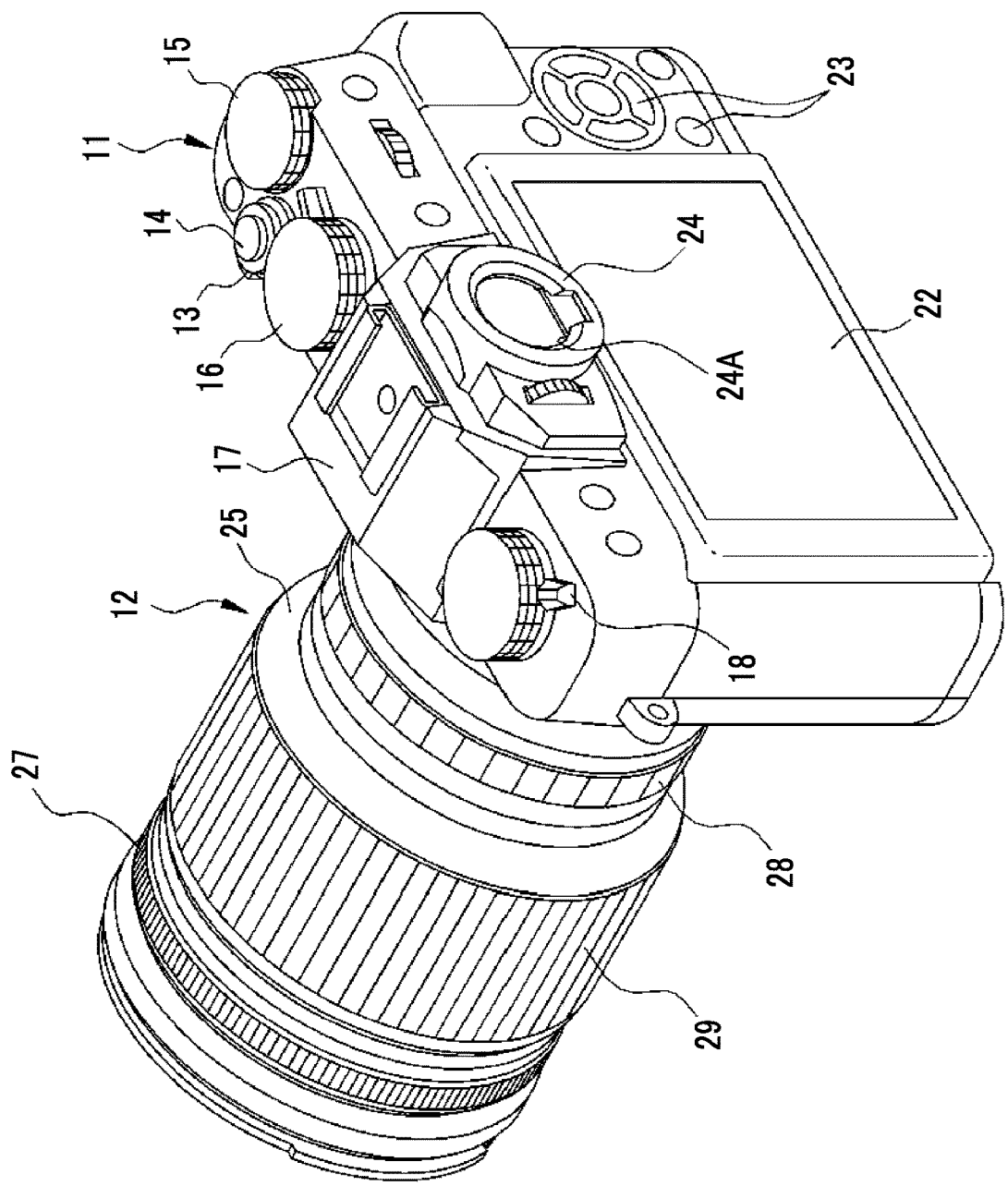
FIG. 3 is a perspective view showing a rear side appearance of the interchangeable lens type digital camera.

As shown in FIG. 3, on a rear surface of the camera main body 11, a rear surface display section 22, a plurality of operating buttons 23, a finder section 24, and the like are provided. The rear surface display section 22 corresponds to a menu display section of the invention, and is used for display of a live view image, reproduction of a captured image, display of a setting menu, or the like. The plurality of operating buttons 23 are used for various setting operations, or the like. The rear surface display section 22 is formed of an LCD panel, for example.

The finder section 24 is an electronic view finder, in which a live view image that is a subject image captured by the solid-state imaging element 21 is displayed on an electronic view finder (EVF) panel 59 (see FIG. 4) formed of the LCD disposed in the back of a finder eyepiece window 24A. An eye of a photographer contacts with the finder eyepiece window 24A.

As shown in FIG. 2, the interchangeable lens 12 comprises a lens barrel 25, an imaging optical system 26, a focus ring 27, a stop operating ring 28, a zoom ring 29, a lens mount 30, and the like. The lens barrel 25 has a cylindrical shape, accommodates the imaging optical system 26 therein, and is provided with the lens mount 30 at a rear end thereof. The imaging optical system 26 forms an image of subject light in the solid-state imaging element 21 in a case where the interchangeable lens 12 is mounted on the camera main body 11. The solid-state imaging element 21 performs imaging on the basis of light emitted from the interchangeable lens 12.

The lens mount 30 is detachably coupled with the mount 19 of the camera main body 11. On the lens mount 30, a lens side signal contact 30A is provided. The lens side signal contact 30A is in contact with the body side signal contact 19A in a case where the lens mount 30 of the interchangeable lens 12 is coupled with the mount of the camera main body 11, so that the interchangeable lens 12 and the camera main body 11 are electrically connected to each other.

Figure 4:
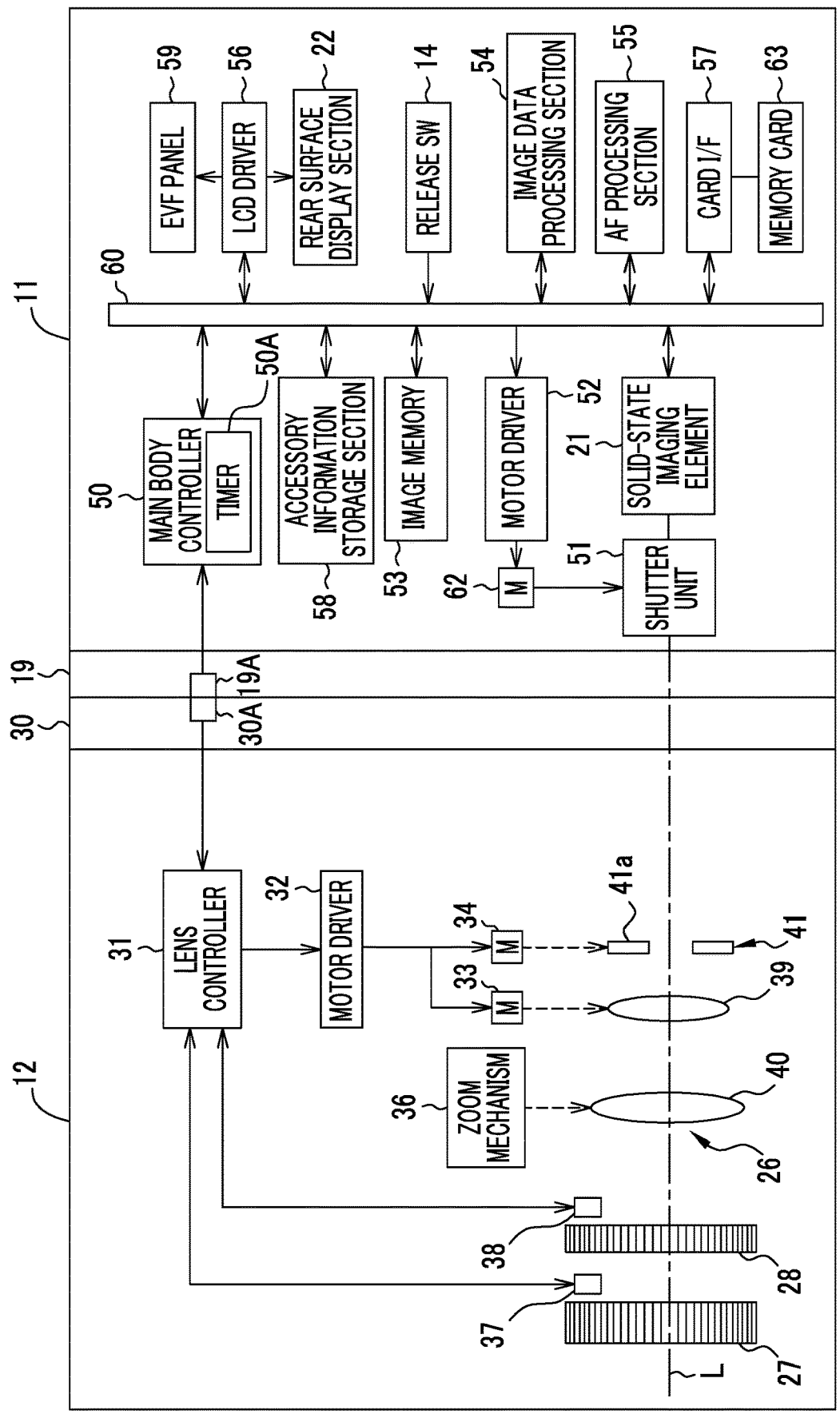
FIG. 4 is a block diagram showing a configuration of the interchangeable lens type digital camera.

As shown in FIG. 4, the interchangeable lens 12 comprises a lens controller 31, a motor driver 32, motors 33 and 34, a zoom mechanism 36, sensors 37 and 38, and the like, in addition to the imaging optical system 26, the focus ring 27, and the stop operating ring 28.

The lens controller 31 is configured of a micro-computer that comprises a central processing unit (CPU), a read only memory (ROM) that stores a program and parameters used in the CPU, a random access memory (RAM) used as a work memory of the CPU (all of which are not shown), and the like, and controls respective units of the interchangeable lens 12. The motor driver 32, and the sensors 37 and 38 are connected to the lens controller 31.

The imaging optical system 26 comprises a plurality of lenses including a focus lens 39, a variable magnification lens 40, a stop unit 41, and the like. The focus lens 39 is moved in a direction of an optical axis L by driving of the motor 33 to adjust an imaging distance. The stop unit 41 moves a plurality of stop leaf blades 41a by driving of the motor 34 to change the quantity of light incident onto the solid-state imaging element 21. The motor driver 32 controls the driving of the motors 33 and 34 under the control of the lens controller 31.

The zoom mechanism 36 is a manual zoom mechanism that converts a rotational operation of the zoom ring 29 into a linear movement to move the variable magnification lens 40. The variable magnification lens 40 is moved in the direction of the optical axis L by the driving of the zoom mechanism 36 to change an angle of view.

The camera main body 11 includes a main body controller 50, a shutter unit 51, a motor driver 52, an image memory 53, an image data processing section 54, an AF processing section 55, an LCD driver 56, a card interface (I/F) 57, an accessory information storage section 58, and the like, in addition to the release switch 14, the solid-state imaging element 21, the rear surface display section 22 and the EVF panel 59 described above, which are connected to each other through a busline 60.

The main body controller 50 comprises a CPU, a ROM that stores a program and parameters used in the CPU, a RAM used as a work memory of the CPU (all of which are not shown), and the like. The main body controller 50 controls the camera main body 11 and the respective units of the interchangeable lens 12 connected to the camera main body 11. An S1 signal and an S2 signal are input to the main body controller 50 from the release switch 14. Further, the body side signal contact 19A is connected to the main body controller 50.

The main body controller 50 transmits a control signal for moving the focus lens 39 in accordance with information on a rotating direction and a rotation amount of the focus ring 27 detected by the lens controller 31 to the lens controller 31. The lens controller 31 controls the motor driver 32 on the basis of the control signal to move the focus lens 39.

The main body controller 50 transmits a control signal for operating the stop unit 41 in accordance with information on a rotating position of the stop operating ring 28 detected by the lens controller 31 to change a stop diameter to the lens controller 31. The lens controller 31 controls the motor driver 32 on the basis of the control signal from the main body controller 50, and controls a stop diameter of the stop unit 41 so that an F number corresponding to a rotating position of the stop operating ring 28 is obtained.

The shutter unit 51 is a so-called focal plane shutter, and is disposed between the mount 19 and the solid-state imaging element 21. The shutter unit 51 is provided to be able to shield an optical path between the imaging optical system 26 and the solid-state imaging element 21, and is changed between an open state and a closed state. The shutter unit 51 is in the open state when a live view image and a motion picture are captured. The shutter unit 51 temporarily enters the closed state from the open state when a still image is captured. The shutter unit 51 is driven by the shutter motor 62. The motor driver 52 controls driving of the shutter motor 62.

The solid-state imaging element 21 is drive-controlled by the main body controller 50. The solid-state imaging element 21 forms an imaging section together with the shutter unit 51, the image data processing section 54, and the like. The imaging section performs imaging in a state where the interchangeable lens 12 is mounted on the mount 19. The solid-state imaging element 21 is a CMOS type image sensor, for example, and has a light-receiving surface formed by a plurality of pixels (not shown) that are arranged in a two-dimensional matrix form. Each pixel includes a photoelectric conversion element, and photoelectrically converts a subject image formed on the light-receiving surface by the interchangeable lens 12 to generate an imaging signal. Further, the solid-state imaging element 21 has an electronic shutter function, and is able to adjust a shutter speed (electric charge accumulation time).

Further, the solid-state imaging element 21 comprises signal processing circuits (all of which are not shown) such as a noise rejection circuit, an auto gain controller, an A/D conversion circuit, and the like. The noise rejection circuit performs a noise rejection process with respect to an imaging signal. The auto gain controller amplifies the level of the imaging signal to an optimal value. The A/D conversion circuit converts the imaging signal into a digital signal, and outputs the result to the busline 60 from the solid-state imaging element 21. The output signal of the solid-state imaging element 21 corresponds to image data (so-called RAW data) having one color signal for each pixel.

The image memory 53 stores image data corresponding to one frame output to the busline 60. The image data processing section 54 reads out image data corresponding to one frame from the image memory 53, and performs known image processing such as matrix operation, demosaicing processing, γ correction, brightness and color difference conversion, or resize processing.

The LCD driver 56 sequentially inputs image data corresponding to one frame that is subjected to image processing in the image data processing section 54 to the rear surface display section 22. The rear surface display section 22 sequentially displays a live view image at a predetermined cycle. The card I/F 57 is embedded in a card slot (not shown) provided in the camera main body 11, and is electrically connected to the memory card 63 inserted in the card slot. The card I/F 57 stores image data that is subjected to image processing in the image data processing section 54 in the memory card 63. The memory card 63 corresponds to a storage medium of the invention. Further, in a case where image data stored in the memory card 63 is reproduced and displayed, the card I/F 57 reads out the image data from the memory card 63.

In a case where a setting mode to be described later is selected, the card I/F 57 is drive-controlled by the main body controller 50, and functions as a reading section that reads out image data and accessory information attached to the image data from the memory card 63. Images stored in the memory card 63 as the image data are images captured by the camera 10 or an imaging device different from the camera 10. The accessory information stored in the memory card 63 is accessory information including imaging conditions in a case where an image is captured and an imaging time point.

Further, the accessory information is stored as an exchangeable image file format (EXIF) data. Further, the storage medium from which image data and accessory information are read out is not limited to the memory card 63, and may be a storage medium from which image data and accessory information can be read out by the camera 10, such as a universal serial bus (USB) memory. Further, the accessory information is not limited to the EXIF format data, and may have any data format capable of causing the accessory information to be attached to a captured image for storage.

In a case where a setting mode is selected by an operation of the operating button 23, the main body controller 50 drive-controls the LCD driver 56 to display the setting menu on the rear surface display section 22. The setting menu is able to set an imaging function of the imaging section formed by the solid-state imaging element 21, the shutter unit 51, the image data processing section 54, and the like. In a case where the main body controller 50 functions as a menu change section (which will be described later), a plurality of display setting items that are selected in accordance with accessory information of image data from a plurality of setting items are displayed in the setting menu.

Figure 5:
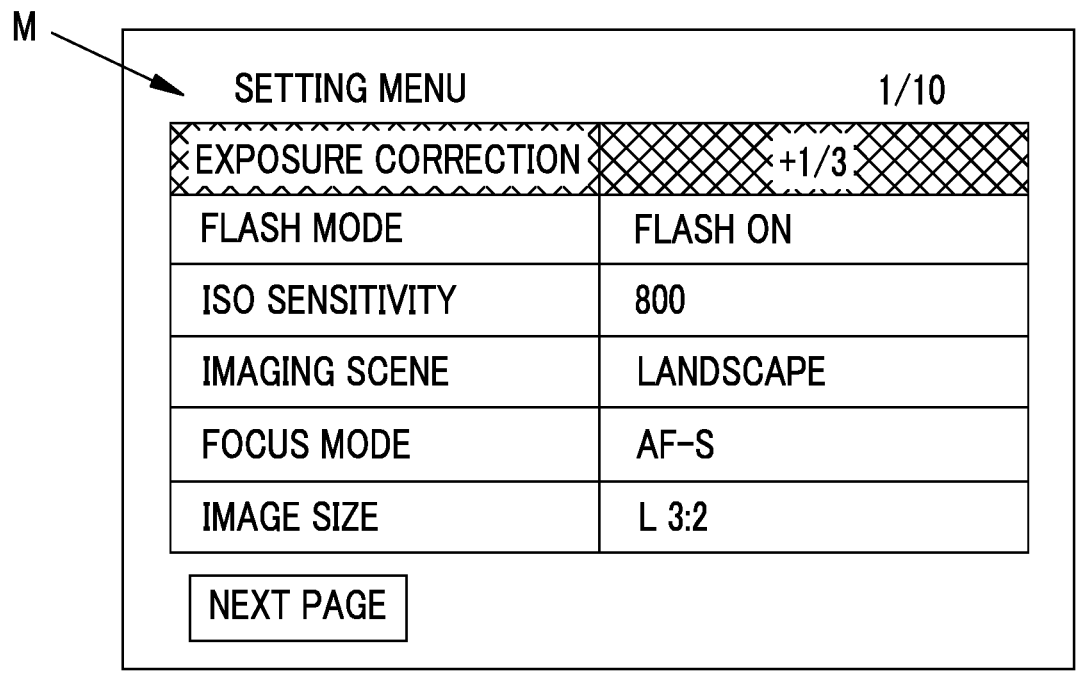
FIG. 5 is a diagram illustrating a display screen showing an example of a setting menu.

FIG. 5 is an example of a setting menu displayed on the rear surface display section 22. In this setting menu M, a plurality of display setting items such as exposure correction, a flash mode, an ISO sensitivity, an imaging scene, a focus mode, and an image size are displayed. The setting menu M may be formed to have a plurality of pages, for example, and a plurality of display setting items may be displayed on each page. Further, in this case, it is possible to perform switching between the pages of the setting menu M using the operating button 23.

In a case where a user sets the imaging function on the basis of a setting menu M1, the user selects one display setting item from the plurality of display setting items by operating the operating button 23, for example. In the example shown in FIG. 5, a display setting item of the exposure correction that is displayed by shading is selected.

In a case where the display setting item of the exposure correction is selected, it is possible to set an exposure correction value by operating the exposure correction dial 15. The exposure correction value is set to have a negative value in a case where a bright subject is made dark, to have a positive value in a case where a dark subject is made bright, and to have a zero value in a case where it is not necessary to perform exposure correction, in which an exposure value (EV) is used as its unit. In the example shown in FIG. 5, +⅓ EV is selected as the exposure correction value.

Figure 6:
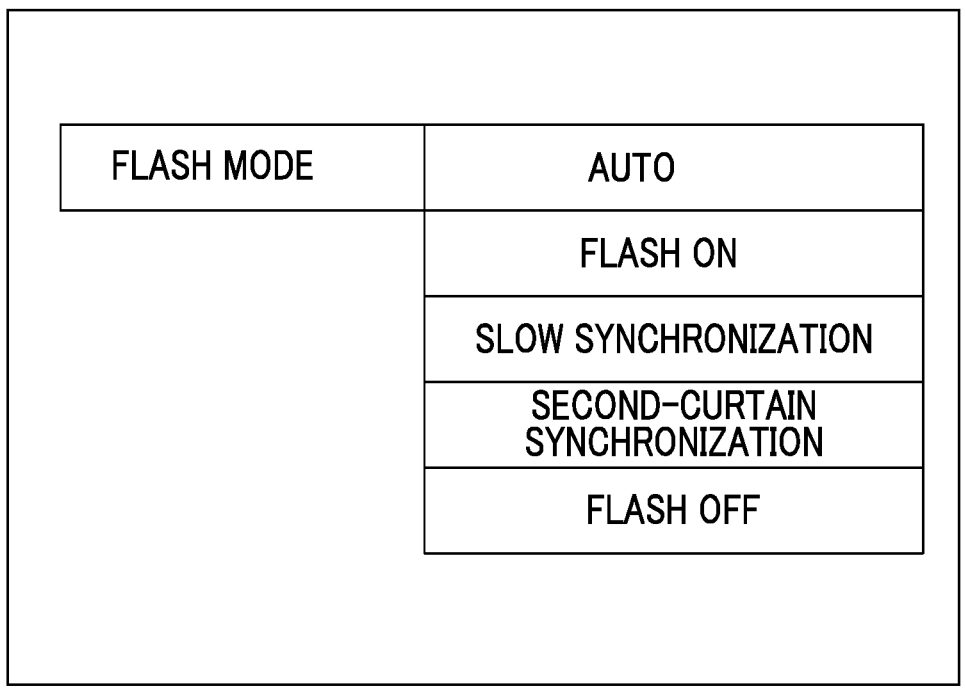
FIG. 6 is a diagram illustrating a display screen showing a selection candidate list in a case where a display setting item of a flash mode is selected from the setting menu.

In a case where the display setting item of the flash mode is selected, as shown in FIG. 6, a selection candidate list of flash mode such as "AUTO", "flash on", "slow synchronization", "second-curtain synchronization", "commander", and "flash off" is displayed. By operating the operating button 23, a flash mode setting is selected from the selection candidate list.

In a case where "AUTO" is selected from the selection candidate list and in a case where it is determined that a subject is dark by using a photometric sensor (not shown), a flash automatically emits light. On the other hand, in a case where "flash on" is selected, the flash forcibly emits light regardless of the ambient brightness. Further, in a case where "slow synchronization" is selected, the shutter speed becomes slow, and the flash emits light in synchronization with the shutter. In a case where "second-curtain synchronization" is selected, the flash is operated immediately before the shutter is closed. Further, in a case where "flash off" is selected, the flash is not operated regardless of the ambient brightness.

In a case where the display setting item of the ISO sensitivity is selected, it is possible to set the ISO sensitivity by operating the shutter speed/ISO sensitivity dial 16. In the example shown in FIG. 5, ISO 800 is selected as the ISO sensitivity.

In a case where the display setting item of the imaging scene is selected, as shown in FIG. 7, a selection candidate list of imaging scenes such as AUTO, a person, a landscape, a sport, or a night scene is displayed. By operating the operating button 23, an imaging scene setting is selected from the selection candidate list.

In a case where AUTO is selected from the selection candidate list, an imaging scene is automatically recognized from a live view image, an imaging condition such as an F number or a shutter speed is set to a setting value suitable for the imaging scene. On the other hand, in a case where an imaging scene such as a person, a landscape, a sport or a night scene is selected, a setting value suitable for each imaging scene is set.

In a case where the display setting item of the focus mode is selected, as shown in FIG. 8, a selection candidate list of focus modes such as AF-S, AF-C, or manual focus is displayed. By operating the operating button 23, the focus mode setting is selected from the selection candidate list.

In a case where AF-S (single AF) is selected from the selection candidate list, and in a case where the release switch 14 is half-pushed, focusing is performed with respect to a subject in a focus area, and the focusing is fixed at it is while the release switch 14 is being half-pushed. On the other hand, in a case where AF-C (continuous AF) is selected, the focusing is continued in accordance with movement of a subject while the release switch 14 is being half-pushed. In a case where the manual focus is selected, focusing may be manually performed by a manual operation of the focus ring 27.

In a case where the display setting item of the image size is selected, as shown in FIG. 9, a selection candidate list of combinations of image sizes such as L, M, and S, and aspect ratios such as 3:2, 16:9, and 1:1 is displayed. By operating the operating button 23, settings of an image size and an aspect ratio are selected from the selection candidate list.

Figure 10:
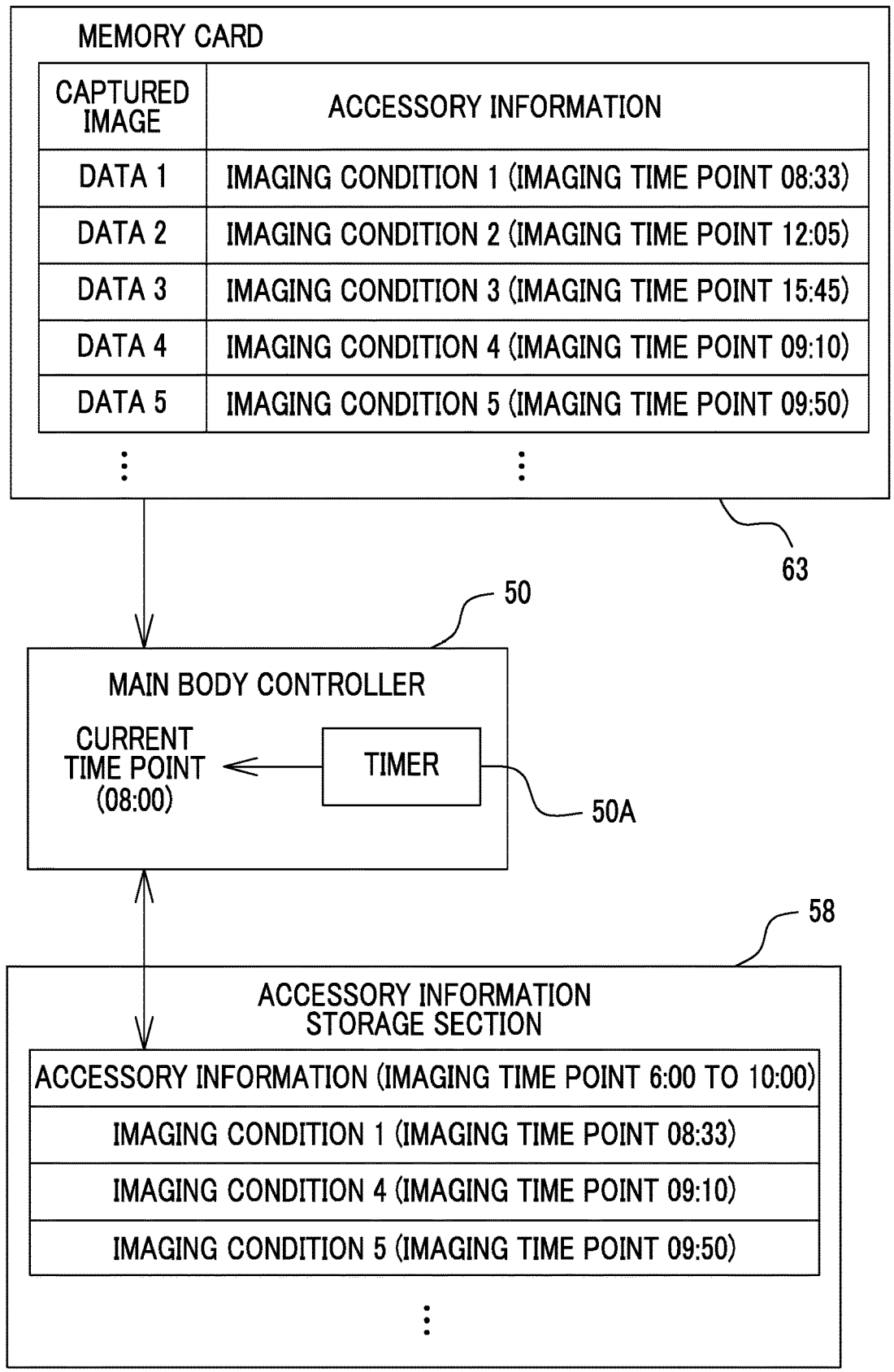
FIG. 10 is a schematic view illustrating a configuration in which accessory information including an imaging time point in a specific time slot is extracted from a plurality of pieces of accessory information read out from a storage section.

As shown in FIG. 10, the main body controller 50 functions as an accessory information extraction section that extracts accessory information including an imaging time point in a specific time slot from a plurality of pieces of accessory information read out from the memory card 63 by the card I/F 57. Specifically, the main body controller 50 acquires a current time point using a timer 50A, and sets a predetermined time range before and after the current time point, including the current time point, as a specific time slot.

The main body controller 50 extracts the accessory information including the imaging time point in the specific time slot, and stores once the result in the accessory information storage section 58. The accessory information storage section 58 is configured of a non-volatile memory such as an electrically erasable programmable read-only memory (EEPROM).

In the example shown in FIG. 10, a current time point is 8:00, and a time range within 2 hours before and after 8:00, including 8:00, that is, 6:00 to 10:00 as a specific time slot. Further, the main body controller 50 extracts accessory information including an imaging time point between 6:00 and 10:00.

Further, the main body controller 50 functions as a menu change section that changes a setting menu in accordance with imaging conditions included in accessory information that is extracted as accessory information including an imaging time point in a specific time slot and is stored in the accessory information storage section 58.

FIG. 11 shows an example of accessory information extracted by the main body controller 50 as accessory information including an imaging time point in a specific time slot. In this embodiment, the main body controller 50 counts the number of changes of an imaging condition used in imaging in the specific time slot for each display setting item, and displays the display setting items in a descending order of the numbers of changes. As a method for counting the number of changes, for example, as shown in FIG. 11, a method for arranging accessory information including an imaging time point in a specific time slot in a time series manner and counting the number of changes of a setting value with respect to an immediately previous imaging condition for each display setting item may be used.

In the case of the example shown in FIG. 11, the number of changes in the display setting item of the exposure correction is 7, which is the most frequent, the numbers of changes in the flash mode and the ISO sensitivity are respectively counted as 3 and 1. The display setting items other than the exposure correction, the flash mode, and the ISO sensitivity are not shown in the figure, but in any case, the number of changes is 0. The invention is not limited thereto. For example, in a case where the imaging condition is changed, change information may be stored as accessory information in advance, and the number of changes may be counted on the basis of the change information.

Further, the main body controller 50 functions as a setting value determination section that determines a setting value of a display setting item. The main body controller 50 determines a setting value most frequently used in imaging in a specific time slot as a setting value of a display setting item, and displays the result in a setting menu. In the example shown in FIG. 11, the most frequently used setting values in the display setting items of the exposure correction, the flash mode, and the ISO sensitivity are respectively +1, flash on, and ISO 800.

Figure 12:
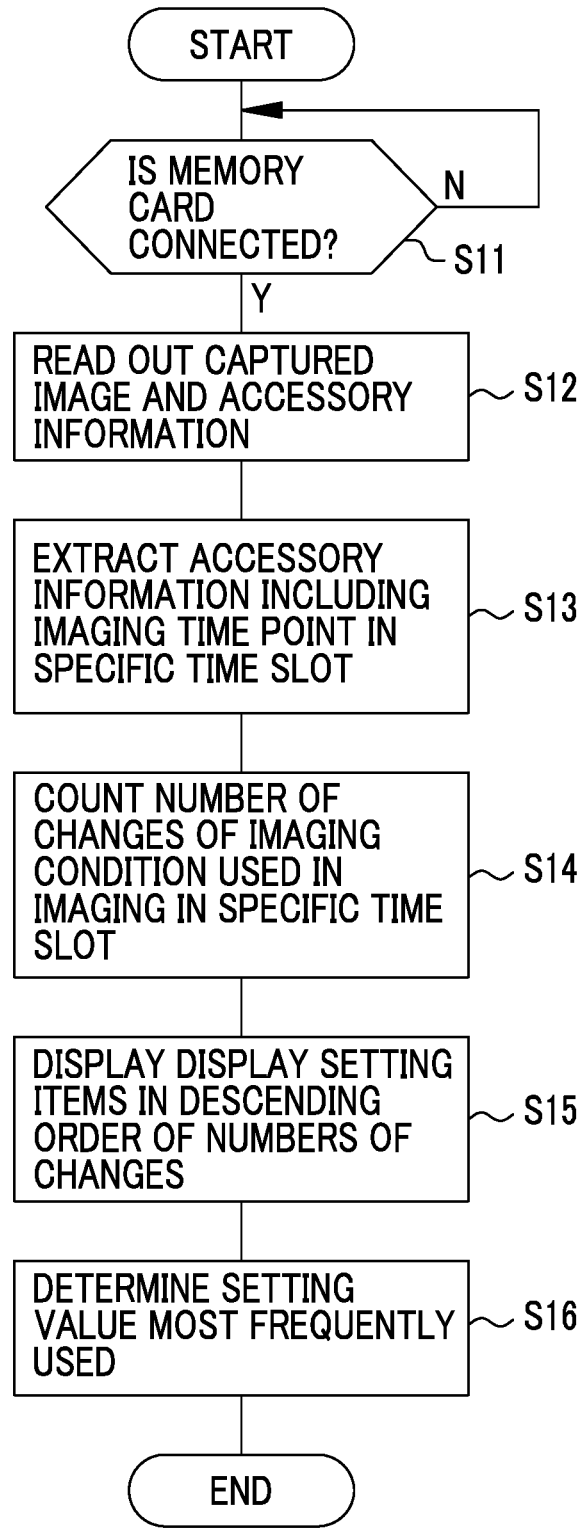
FIG. 12 is a flowchart illustrating a process in a case where a setting menu is changed.

A processing procedure for extracting accessory information including an imaging time point in a specific time slot from a plurality of pieces of accessory information read out from the memory card 63 and changing a setting menu in accordance with imaging conditions included in the extracted accessory information will be described with reference to a flowchart shown in FIG. 12.

In a case where the camera 10 is in a setting mode and the memory card 63 is connected to the camera main body 11 (Y in S11), the main body controller 50 reads out image data and accessory information from the connected memory card 63 (S12).

Then, the main body controller 50 extracts accessory information including an imaging time point in a specific time slot from the read-out accessory information, and stores once the result in the accessory information storage section 58 (S13). The main body controller 50 counts the number of changes of an imaging condition used in imaging in the specific time slot from imaging conditions that are extracted as the accessory information including the imaging time point in the specific time slot and is once stored in the accessory information storage section 58 (S14), and displays display setting items in a descending order of the numbers of changes in a setting menu (S15). Further, the main body controller 50 determines a setting value most frequently used in imaging in the specific time slot as a setting value of a display setting item, and displays the result in the setting menu (S16).

Figure 13:
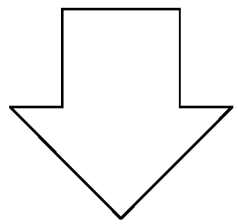
FIG. 13 is a diagram illustrating an example in which a setting menu is changed.

FIG. 13 shows an example of a setting menu changed on the basis of the above-described process. In a setting menu M1 before change, an imaging scene, a focus mode, an image size, an ISO sensitivity, exposure correction, and a flash mode are sequentially displayed. In the example shown in FIG. 11, since the number of changes of a setting value for each display setting item is large in the order of the exposure correction, the flash mode, the ISO sensitivity, and so on, in a case where the display setting items are re-arranged in a descending order of the numbers of changes in accordance with the example shown in FIG. 11, the display setting items are displayed in the order of the exposure correction, the flash mode, the ISO sensitivity, the imaging scene, the focus mode, and the image size, as in a setting menu M2 after change.

Further, in the example shown in FIG. 11, since the most frequently used setting values of the exposure correction, the flash mode, and the ISO sensitivity as the setting values most frequently used in imaging in the specific time slot are respectively +1, flash on, and ISO 800, the setting values are changed to these values in the setting menu M2 after change.

As described above, in this embodiment, since accessory information including an imaging time point in a specific time slot is extracted and a setting menu is changed in accordance with imaging conditions included in the extracted accessory information, it is possible to appropriately change display content of the setting menu in accordance with the imaging time point.

Further, in this embodiment, since a current time point is acquired and a time slot within two hours before and after the current time point, including the current time point, is set as a specific time slot, it is possible to perform setting to display content of a setting menu suitable for a current situation.

Second Embodiment

Figure 14:
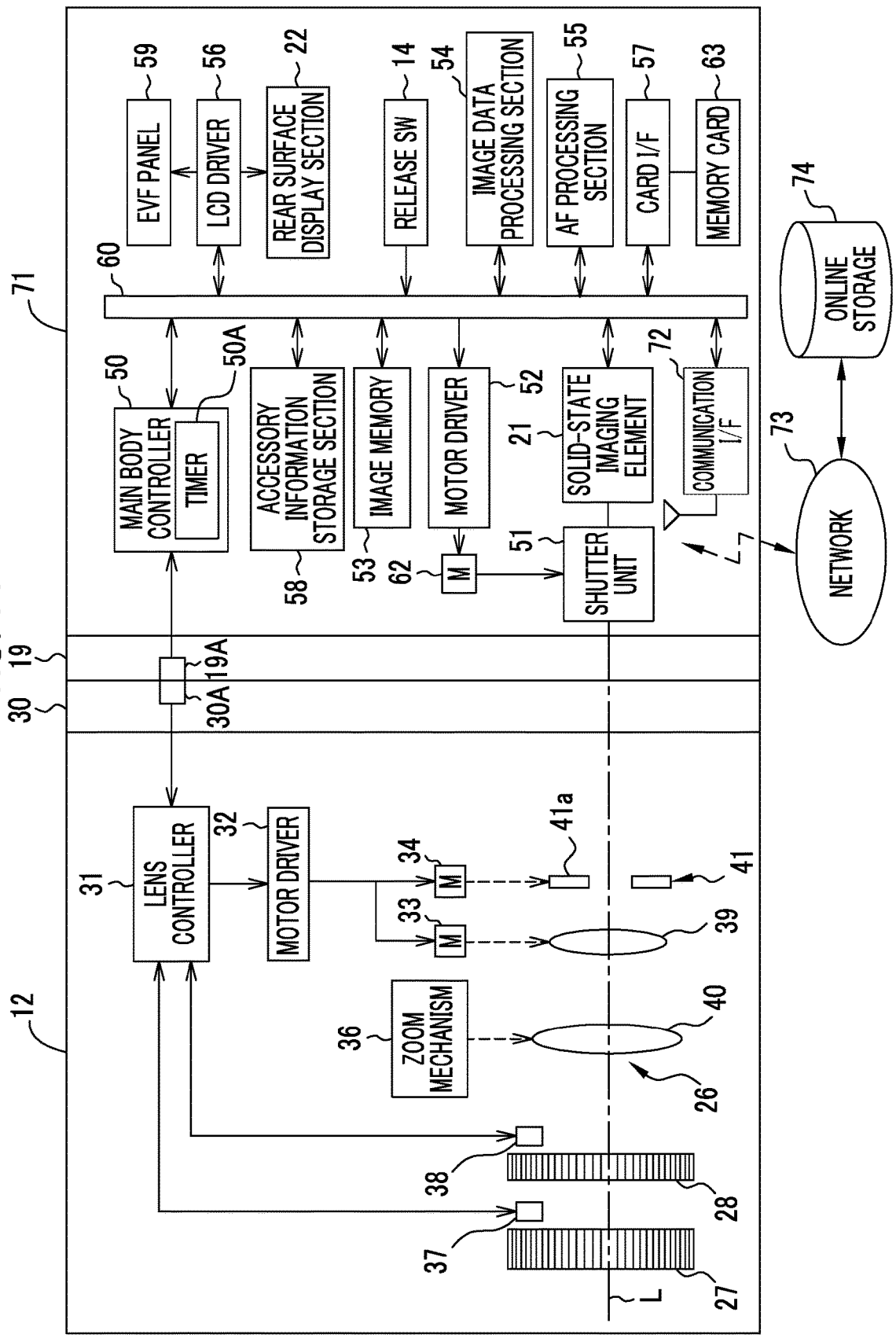
FIG. 14 is a block diagram showing a configuration according to a second embodiment.

In the first embodiment, as a storage section from which a captured image and accessory information are read out, a storage medium such as the memory card 63 is used as an example, but the invention is not limited thereto. In a second embodiment to be described below, an online storage may be used as a storage section. As shown in FIG. 14, a camera main body 71 of this embodiment comprises a communication I/F 72 that communicates with a network 73. The same reference numerals are given to the same components as in the first embodiment, and repetitive description thereof will not be performed.

As shown in FIG. 14, the communication I/F 72 communicates with an online storage 74 through the network 73. The network 73 is a communication network such as the Internet that performs data communication. The online storage 74 is a server device connected through the network 73, and for example, employs a so-called cloud service that shares a file on the Internet. Further, as the cloud service, a commercial service such as Dropbox (registered trademark) or OneDrive (registered trademark) may be used.

In this embodiment, in a case where a setting mode is selected, the communication I/F 72 functions as a reading section that is drive-controlled by the main body controller 50 and reads out image data and accessory information attached to the image data from the online storage 74. A subsequent processing procedure is the same as in the first embodiment.

As a modification example of the second embodiment, an example in which a captured image and accessory information are read out from a plurality of storage sections and a setting menu is changed on the basis of the read-out accessory information will be described with reference to a drawing shown in FIG. 15 and a flowchart shown in FIG. 16.

Figure 15:
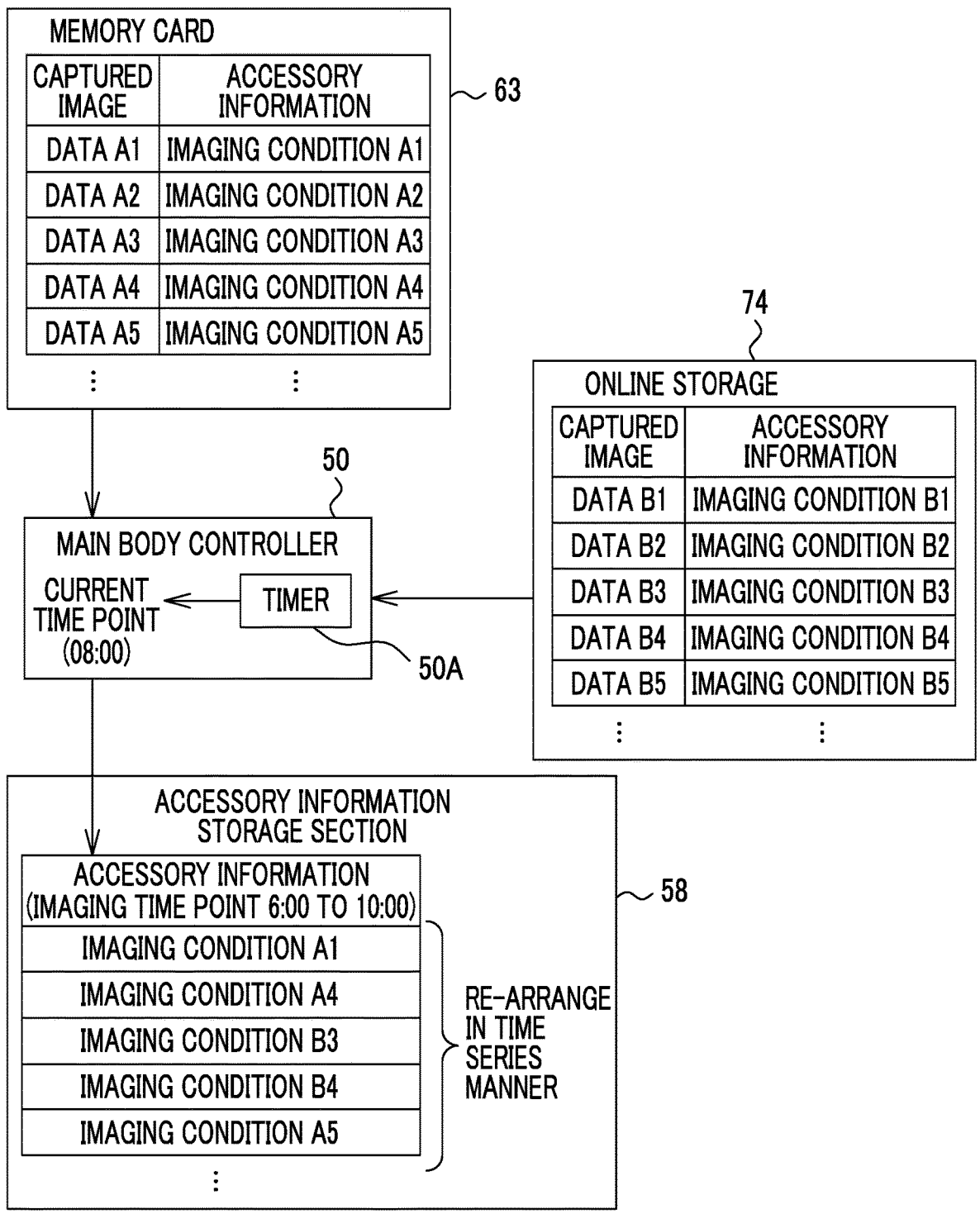
FIG. 15 is a schematic view illustrating a configuration in which accessory information including an imaging time point in a specific time slot is extracted from a plurality of pieces of accessory information read out from a plurality of storage sections.

As shown in FIG. 15, the main body controller 50 functions as an accessory information extraction section that extracts accessory information including an imaging time point in a specific time slot from a plurality of pieces of accessory information read out from the memory card 63 using the card I/F 57 and a plurality of pieces of accessory information read out from the online storage 74 using the communication I/F 72. The specific time slot is a time slot over two hours before and after the current time point, including the current time point, in a similar way to the first embodiment.

In the example shown in FIG. 15, a current time point is 8:00, and the main body controller 50 extracts imaging conditions A1, A4, A5, and so on from the memory card 63, and extracts imaging conditions B3, B4, and so on from the online storage 74, as accessory information including an imaging time point between 6:00 and 10:00. Further, the main body controller 50 re-arranges the accessory information extracted as the accessory information including the imaging time point in the specific time slot in a time series manner.

Figure 16:
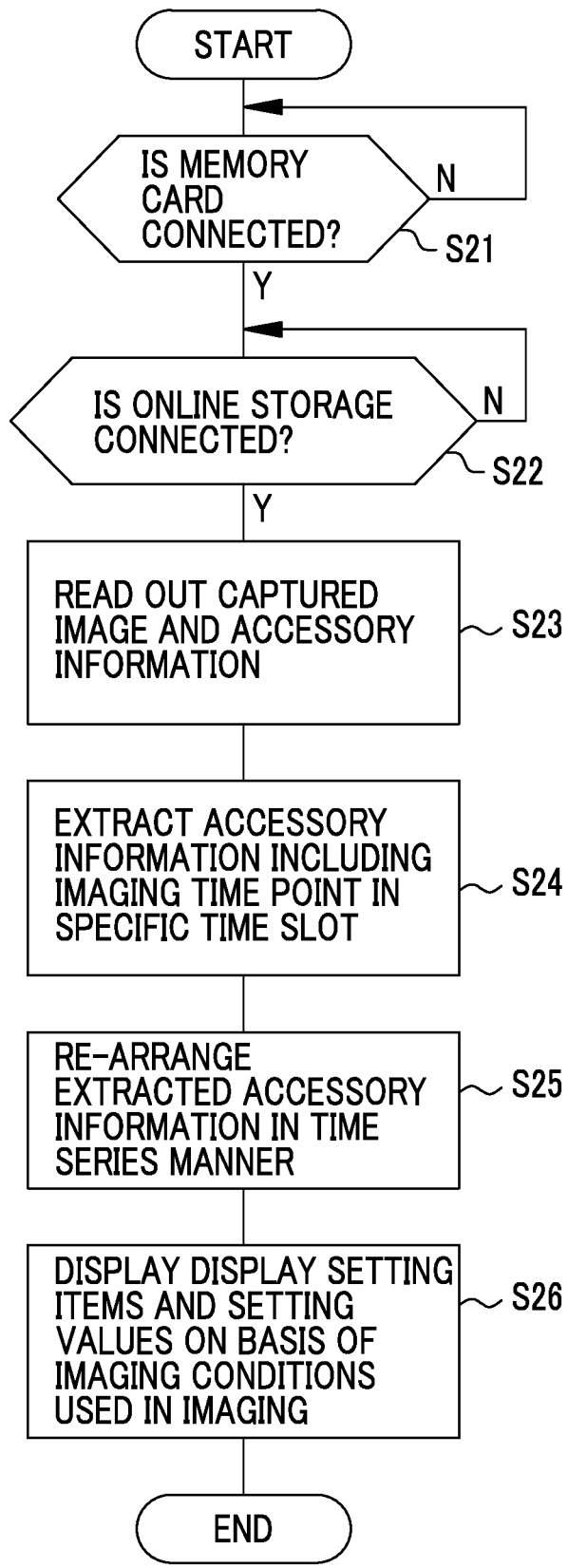
FIG. 16 is a flowchart illustrating a process in a case where a setting menu is changed according to the second embodiment.

With respect to a processing procedure for changing a setting menu, as shown in the flowchart shown in FIG. 16, in a case where the camera 10 is in a setting mode and the memory card 63 is connected to the camera main body 71 (Y in S21) and is connected to be able to communicate with the online storage 74 (Y in S22), the main body controller 50 reads out image data and accessory information from the memory card 63 and the online storage 74 (S23).

Among the read-out accessory information, accessory information including an imaging time point in a specific time slot is extracted and is once stored in the accessory information storage section 58 (S24). The main body controller 50 re-arranges imaging conditions that are extracted as the accessory information including the imaging time point in the specific time slot and are once stored in the accessory information storage section 58 in a time series manner (S25). Thereafter, on the basis of the imaging conditions that are re-arranged in the time series manner, in a similar way to the first embodiment, display setting items and setting values are displayed on a setting menu (S26). As described above, in a case where accessory information is read out from a plurality of storage sections, similar to the first embodiment, it is possible to appropriately change display content of a setting menu in accordance with an imaging time point.

As a modification example of the second embodiment, only a plurality of pieces of accessory information used in imaging within a predetermined period may be extracted from the plurality of pieces of accessory information that are re-arranged by the main body controller 50 in a time series manner and are stored in the accessory information storage section 58, and a setting menu may be changed on the basis of imaging conditions used in the imaging within the predetermined period. The predetermined period may be a predetermined period such as a period of time within one week prior to a current time point, or may be set by a user.

Further, in the first and second embodiment, a time slot over two hours before and after a current time point, including the current time point, is set as a specific time slot, but the invention is not limited thereto. For example, the specific time slot may be a time slot within a predetermined time including a current time point, and may be a time slot included in one of a daytime slot and a nighttime slot. In this case, the main body controller 50 that functions as a daytime/nighttime slot determination section sets, for example, the daytime slot to 06:00 to 18:00 and sets the nighttime slot to 18:00 to 06:00, and sets a time slot of four hours as the predetermined time in which the current time point is included.

Further, in a case where 2 hours before and after the current time point are entirely included in any one of the daytime slot or the nighttime slot, 2 hours before and after the current time point is set as a specific time slot, but in a case where 2 hours before and after the current time point are straddled between both the daytime slot and the nighttime slot, a time range before and after the current time point is adjusted to be included in any one of the daytime slot or the nighttime slot in which the current time point is included. For example, in a case where the daytime slot, the nighttime slot, and the predetermined time are set as described above and the current time point is 17:00, since a time range of 2 hours before and after the current time point corresponds to 15:00 to 19:00 and is straddled over both of the daytime slot and the nighttime slot, a time range of 14:00 to 18:00 obtained by adjusting one hour corresponding to a time range of 18:00 to 19:00 included in the nighttime slot to come before the current time point is set to a specific time slot, so that the specific time slot is included in the daytime slot in which the current time point (17:00) is included.

Third Embodiment

In the first embodiment, only accessory information including an imaging time point in a specific time slot is extracted from accessory information read out from the storage section, but the invention is not limited thereto. In a third embodiment to be described hereinafter, in a case where there is no accessory information including an imaging time point in a specific time slot, it is determined whether the current time point is any one of a daytime slot or a nighttime slot, and accessory information including an imaging time point in the determined time slot is extracted. The specific time slot is a time slot of 2 hours including a current time point, in a similar way to the first and second embodiments.

In this embodiment, the main body controller 50 functions as a daytime/nighttime slot determination section that determines whether a current time point acquired by the timer 50A is included in the daytime slot or the nighttime slot. The determination of whether the current time point is included in the daytime slot or the nighttime slot is performed on the basis of predetermined time slots, for example, by setting the daytime slot to 06:00 to 18:00 and the nighttime slot to 18:00 to 06:00 and determining which time slot the current time point is included in. The setting of the daytime slot and the nighttime slot is not limited to the above description, and for example, may be performed by a user. Further, the daytime slot and the nighttime slot may be set depending on the date to be changed on the basis of a current date and a current time point.

In a case where there is no accessory information including an imaging time point in a specific time slot in accessory information read out from the storage section, the main body controller 50 extracts accessory information including an imaging time point in any one time slot of the daytime slot or the nighttime slot determined by the daytime/nighttime slot determination section.

Figure 17:
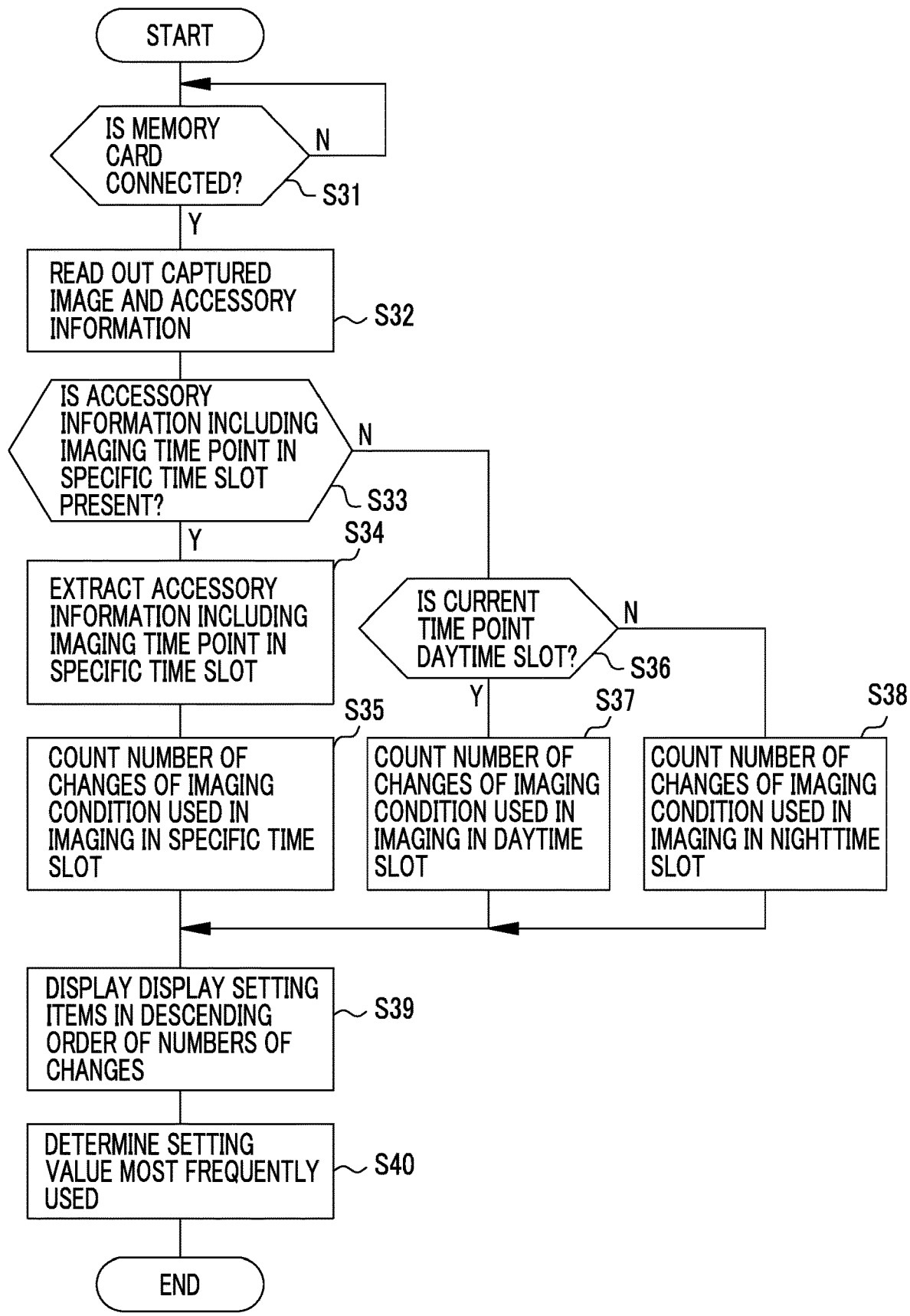
FIG. 17 is a flowchart illustrating a process in a case where a setting menu is changed according to a third embodiment.

With respect to a processing procedure for changing a setting menu, as shown in the flowchart shown in FIG. 17, in a case where the camera 10 is in a setting mode and the memory card 63 is connected to the camera main body 11 (Y in S31), the main body controller 50 reads out image data and accessory information from the memory card 63 (S32).

Then, in a case where there is accessory information including an imaging time point in a specific time slot in the read-out accessory information (Y in S33), the accessory information including the imaging time point in the specific time slot is extracted and is once stored in the accessory information storage section 58 (S34). The main body controller 50 counts the number of changes of an imaging condition used in imaging in the specific time slot from imaging conditions that are extracted as the accessory information including the imaging time point in the specific time slot and are once stored in the accessory information storage section 58 (S35).

In a case where there is no accessory information including the imaging time point in the specific time slot in the read-out accessory information (N in S33), the main body controller 50 determines whether a current time point acquired by the timer 50A is included in the daytime slot or the nighttime slot (S36). In a case where the current time point is included in the daytime slot (Y in S36), the main body controller 50 extracts accessory information including an imaging time point in the daytime slot and counts the number of changes of an imaging condition used in imaging in the daytime slot (S37). Further, in a case where the current time point is included in the nighttime slot (N in S36), the main body controller 50 extracts accessory information including an imaging time point in the nighttime slot, and counts the number of changes of an imaging condition used in imaging in the nighttime slot (S38).

Then, on the basis of the results counted in S35, S37 or S38, display setting items are displayed in a setting menu in a descending order of the numbers of changes (S39). Further, the main body controller 50 determines a setting value most frequently used in imaging in each extracted time slot as a setting value of a display setting item, and displays the result in a setting menu (S40). As described above, even in a case where there is no accessory information including an imaging time point in a specific time slot, in a similar way to the first embodiment, it is possible to appropriately change display content of a setting menu in accordance with a usage situation of a user.

In the third embodiment, a time range of 2 hours before and after a current time point are set as a specific time slot, and in a case where there is no accessory information including an imaging time point in the specific time slot, accessory information including an imaging time point in any one of daytime slot or nighttime slot including the current time point is extracted, but the invention is not limited thereto. For example, in an initial step for extracting accessory information, any one of the daytime slot or the nighttime slot in which the current time point is included may be determined as a specific time slot. In this case, the main body controller 50 that functions as the daytime/nighttime slot determination section determines any one of the daytime slot or the nighttime slot as the specific time slot, and then, extracts accessory information including an imaging time point in the specific time slot and changes a setting menu in accordance with imaging conditions included in the extracted accessory information, in a similar way to the first and second embodiments.

Fourth Embodiment

In a fourth embodiment to be described hereinafter, in a case where there is no accessory information including an imaging time point in a specific time slot, accessory information relating to information on a current position is extracted. A specific time slot corresponds to a time slot of 2 hours before and after a current time point, including the current time point, in a similar way to the first to third embodiments.

Figure 18:
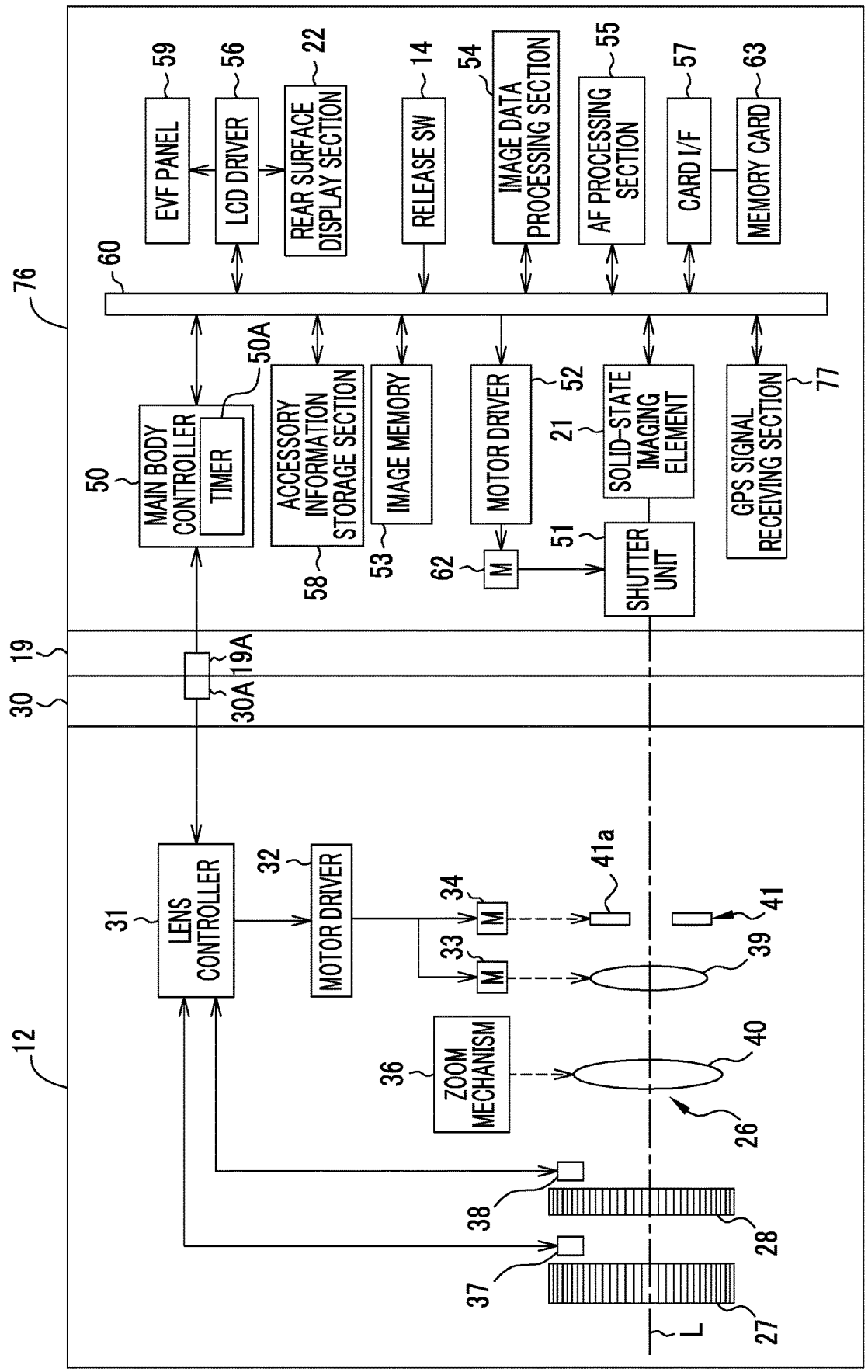
FIG. 18 is a block diagram showing a configuration according to a fourth embodiment.

As shown in FIG. 18, a camera main body 76 of this embodiment comprises a global positioning system (GPS) signal receiving section 77. The same reference numerals are given to the same components as in the first to third embodiments, and repetitive description thereof will not be performed. In this embodiment, accessory information stored in a storage section such as the memory card 63 includes information on a position when an image is captured.

The GPS signal receiving section 77 is a position information acquisition section that acquires information on a current position of the camera 10. The main body controller 50 extracts, in a case where accessory information including an imaging time point in a specific time slot is not present in accessory information read out from the storage section, accessory information relating to the information on the current position acquired by the GPS signal receiving section 77, specifically, accessory information including position information that matches the information on the current position acquired by the GPS signal receiving section 77. Here, the "matching" includes approximate matching, which includes, for example, a case in which a distance between the information on the current position and the position information included in the accessory information is within a predetermined distance range.

Figure 19:
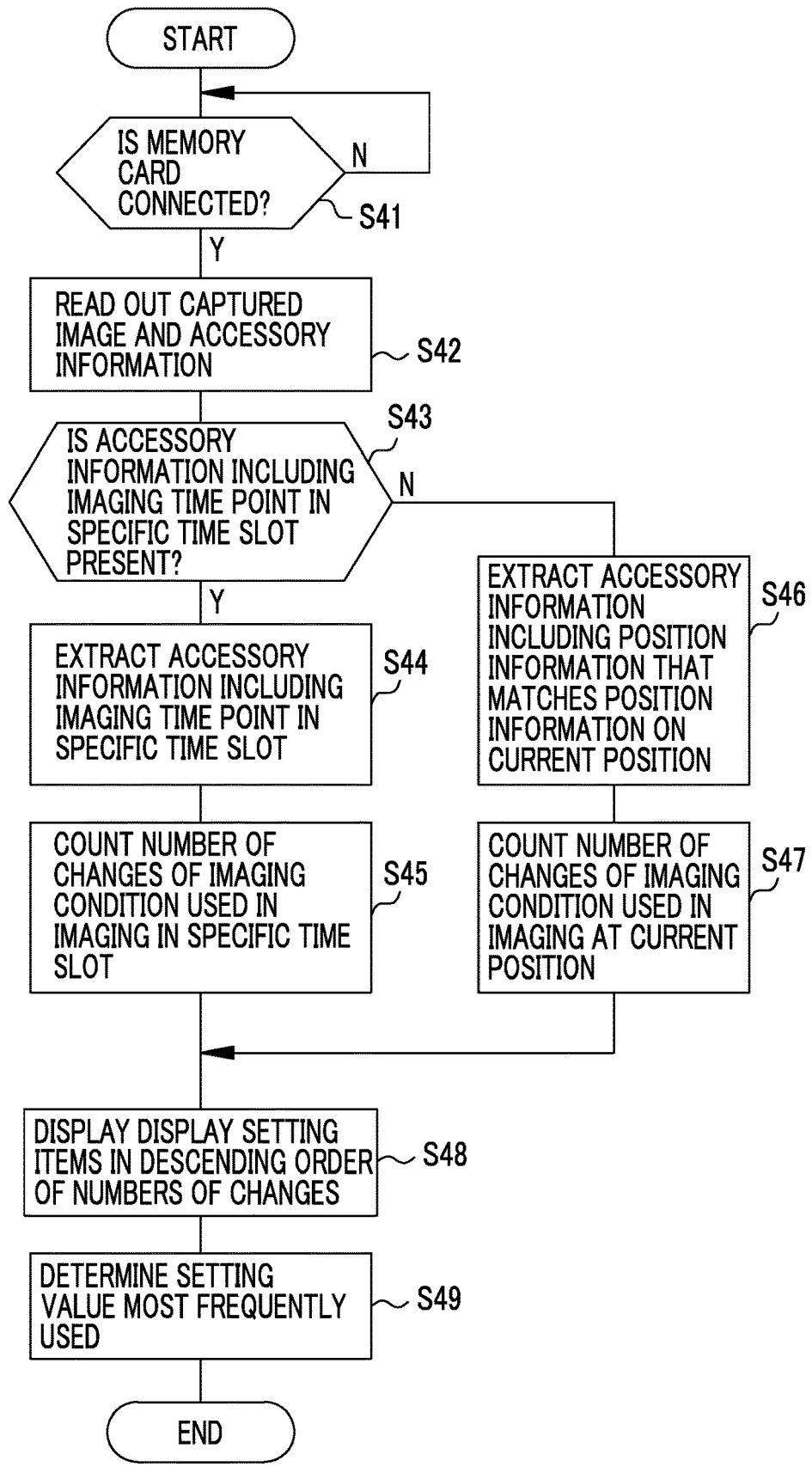
FIG. 19 is a flowchart illustrating a process in a case where a setting menu is changed according to the fourth embodiment.

With respect to a processing procedure for changing a setting menu, as shown in the flowchart shown in FIG. 19, in a case where the camera 10 is in a setting mode and the memory card 63 is connected to the camera main body 76 (Y in S41), the main body controller 50 reads out image data and accessory information from the memory card 63 (S42).

Then, in a case where the accessory information including the imaging time point in the specific time slot is present in the read-out accessory information (Y in S43), the accessory information including the imaging time point in the specific time slot is extracted and is once stored in the accessory information storage section 58 (S44). The main body controller 50 counts the number of changes of an imaging condition used in imaging in the specific time slot from imaging conditions that are extracted as the accessory information including the imaging time point in the specific time slot and is once stored in the accessory information storage section 58 (S45).

In a case where the accessory information including the imaging time point in the specific time slot is not present in the read-out accessory information (N in S43), the main body controller 50 extracts accessory information that matches the information on the current position acquired by the GPS signal receiving section 77 (S46), and counts the number of changes of an imaging condition used in imaging at the current position (S47).

Then, on the basis of the result counted in S45 or S47, display setting items are displayed in a setting menu in a descending order of the numbers of changes (S48). Further, the main body controller 50 determines a setting value most frequently used in imaging in each extracted time slot as a setting value of a display setting item, and displays the result in a setting menu (S49). As described above, even in a case where there is no accessory information including an imaging time point in a specific time slot, it is possible to appropriately change display content of a setting menu in accordance with a usage situation of a user.

Fifth Embodiment

In a fifth embodiment to be described hereinafter, in a case where there is no accessory information including an imaging time point in a specific time slot and a face image is detected, accessory information relating to person imaging is extracted, and in a case where the face image is not detected, the accessory information relating to non-person imaging is extracted. A specific time slot corresponds to a time slot of 2 hours before and after a current time point, including the current time point, in a similar way to the first to fourth embodiments.

Figure 20:
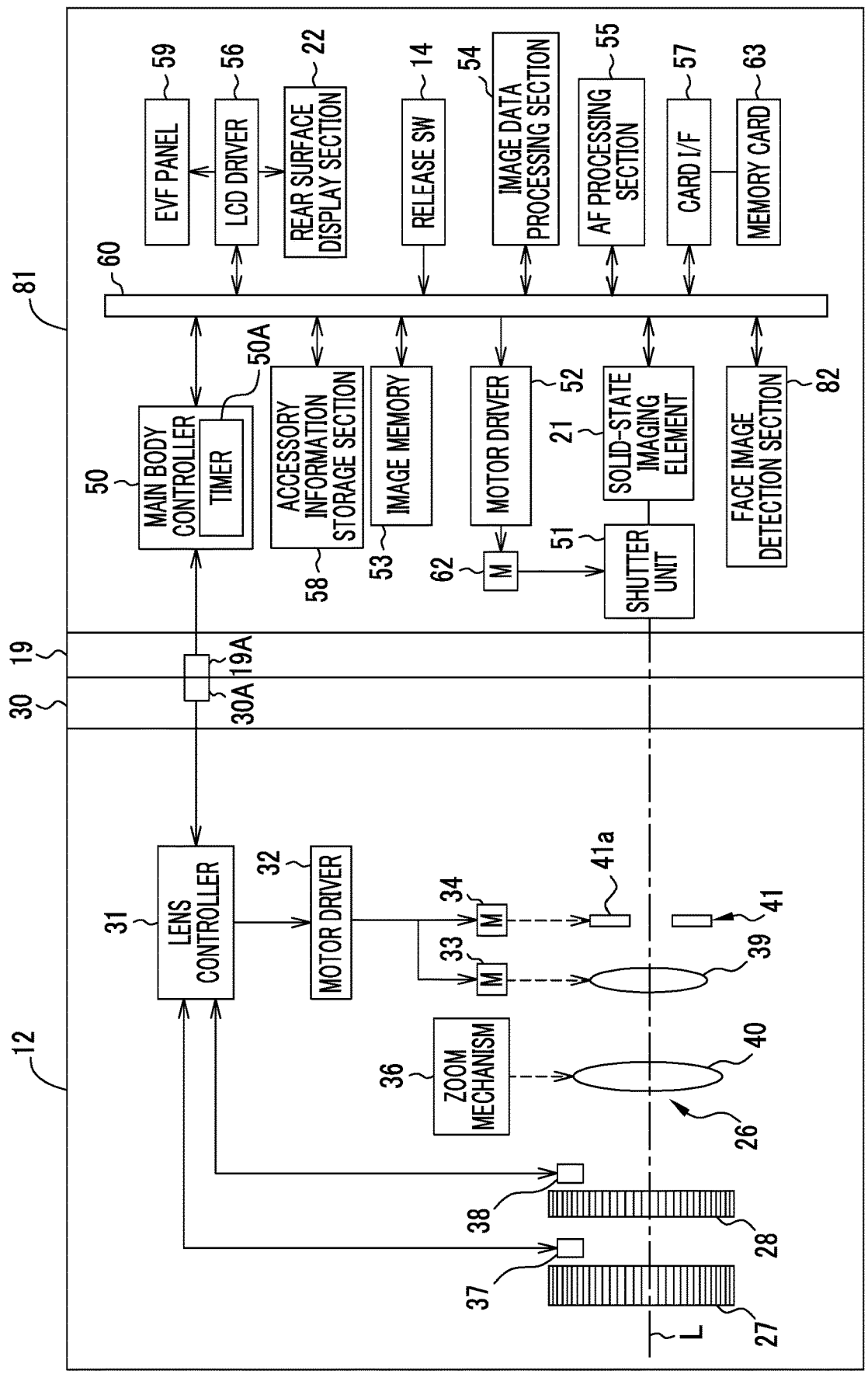
FIG. 20 is a block diagram showing a configuration according to a fifth embodiment.

As shown in FIG. 20, a camera main body 81 of this embodiment comprises a face image detection section 82. The same reference numerals are given to the same components as in the first to fourth embodiments, and repetitive description thereof will not be performed. In this embodiment, accessory information stored in a storage section such as the memory card 63 includes information relating to an imaging scene as imaging conditions when an image is captured.

The face image detection section 82 detects a face image from a live view image displayed on the rear surface display section 22 or the EVF panel 59. As a method for detecting a face image by the face image detection section 82, a known template matching method or the like may be used. In a case where accessory information including an imaging time point in a specific time slot is not present in accessory information read out from the storage section, the main body controller 50 determines whether a face image is detected from a live view image using the face image detection section 82.

In a case where the accessory information including the imaging time point in the specific time slot is not present in the accessory information read out from the storage section and the face image is detected by the face image detection section 82, the main body controller 50 extract accessory information relating to person imaging, and in a case where the accessory information including the imaging time point in the specific time slot is not present and the face image is not detected by the face image detection section 82, the main body controller 50 extracts accessory information relating to non-person imaging.

In this embodiment, the accessory information relating to the person imaging refers to accessory information including imaging conditions for setting an imaging scene including a person subject, such as a person or a sport, and the accessory information relating to the non-person imaging refers to accessory information including imaging conditions for setting an imaging scene including a non-person subject, such as a landscape or a night scene. The accessory information relating to the person imaging is not limited to the above description, and may be any information relating to person imaging, which may be accessory information including imaging conditions for a red eye reduction light emission mode in a flash mode, for a red eye correction mode, a whitening mode or a beautiful skin mode performed in a filtering process with respect to a captured image, or for an effect processing process of a face image.

Figure 21:
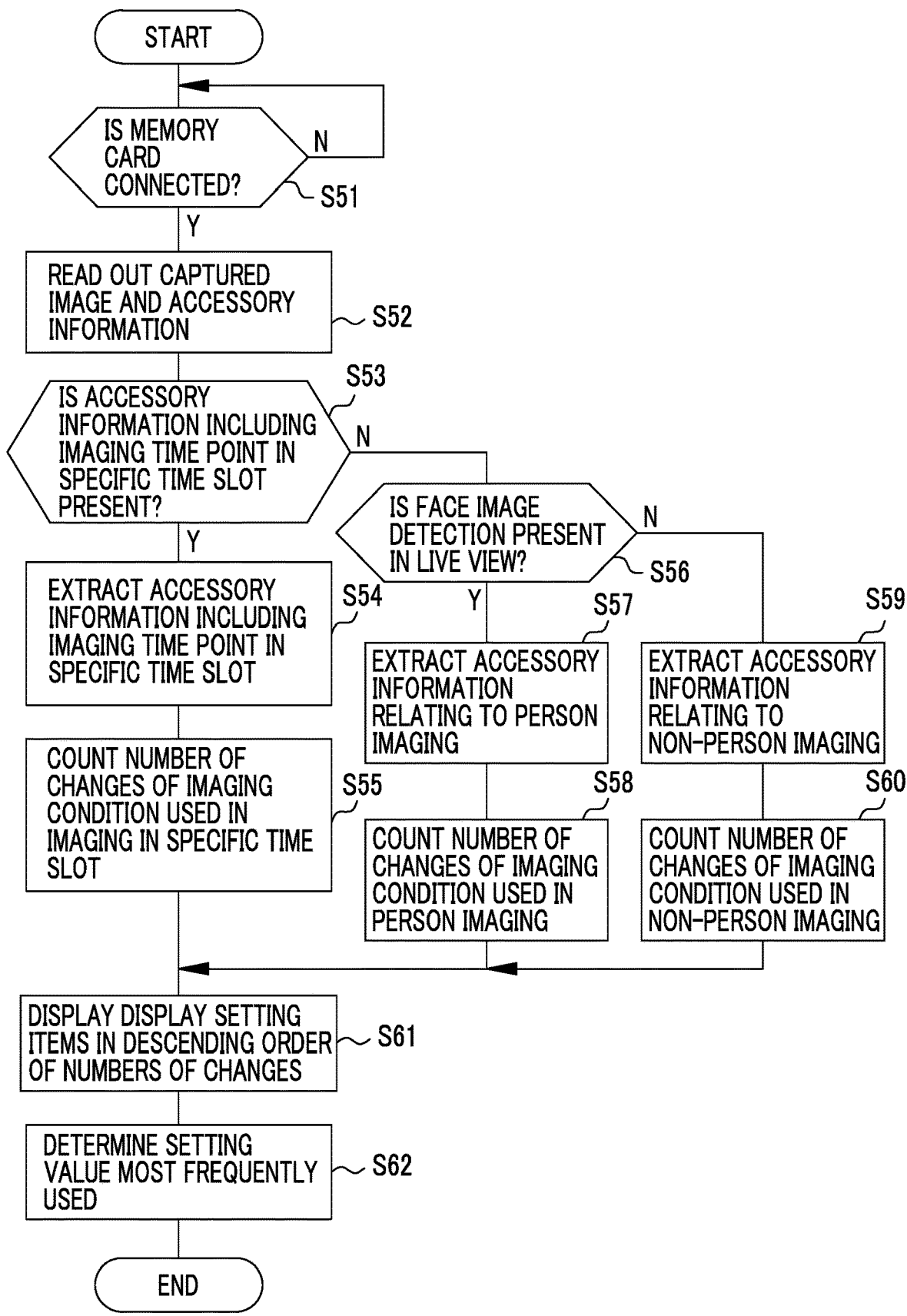
FIG. 21 is a flowchart illustrating a process in a case where a setting menu is changed according to the fifth embodiment.

With respect to a processing procedure for changing a setting menu, as shown in the flowchart shown in FIG. 21, in a case where the camera 10 is in a setting mode and the memory card 63 is connected to the camera main body 81 (Y in S51), the main body controller 50 reads out image data and accessory information from the memory card 63 (S52).

In a case where accessory information including an imaging time point in a specific time slot is present in the read-out accessory information (Y in S53), the accessory information including the imaging time point in the specific time slot is extracted and is once stored in the accessory information storage section 58 (S54). The main body controller 50 counts the number of changes of an imaging condition used in imaging in the specific time slot from imaging conditions that are extracted as the accessory information including the imaging time point in the specific time slot and is once stored in the accessory information storage section 58 (S55).

In a case where the accessory information including the imaging time point in the specific time slot is not present in the read-out accessory information (N in S53), the main body controller 50 determines whether a face image is detected from a live view image by the face image detection section 82 (S56). In a case where the face image is detected (Y in S56), accessory information relating to person imaging is extracted (S57), and the number of changes of an imaging condition used in person imaging is counted (S58).

On the other hand, in a case where the face image is not detected (N in S56), accessory information relating to non-person imaging is extracted (S59), and the number of changes in an imaging condition used in non-person imaging is counted (S60). On the basis of the results counted in S55, S58, or S60, display setting items are displayed in a setting menu in a descending order of the numbers of changes (S61). Further, the main body controller 50 determines a setting value most frequently used in imaging in each extracted time slot as a setting value of a display setting item, and displays the result in a setting menu (S62). As described above, even in a case where there is no accessory information including an imaging time point in a specific time slot, it is possible to appropriately change display content of a setting menu in accordance with a usage situation of a user.

Sixth Embodiment

In the first to fifth embodiments, the main body controller 50 determines a value most frequently used in a display setting item as a setting value on the basis of imaging conditions included in extracted accessory information, as a setting value of a setting menu, but a configuration for determining the setting value is not limited thereto. In a sixth embodiment to be described hereinafter, a configuration in which an exposure value is detected from a subject image and a setting value is changed in accordance with the exposure value is used.

Figure 22:
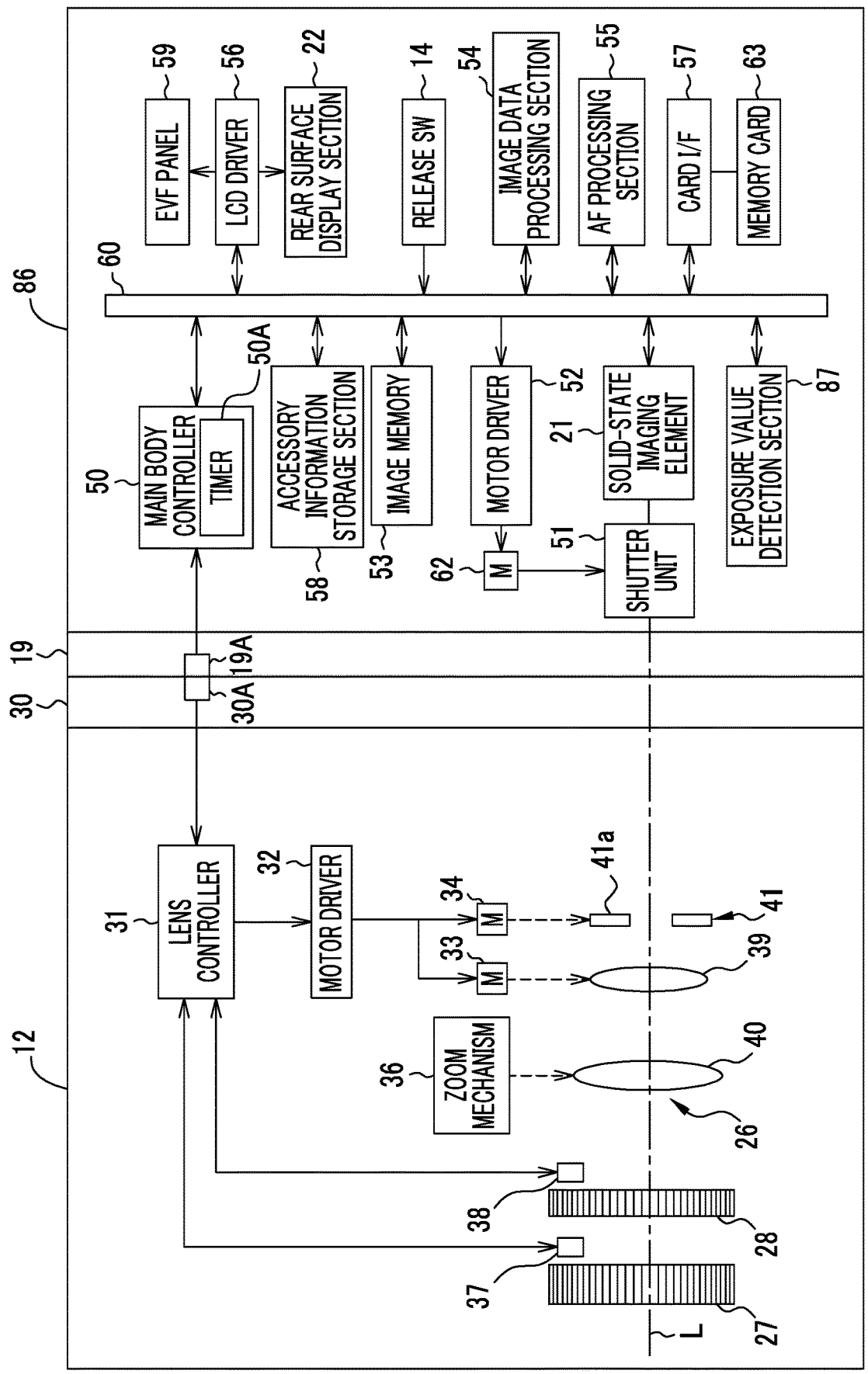
FIG. 22 is a block diagram showing a configuration according to a sixth embodiment.

As shown in FIG. 22, a camera main body 86 of this embodiment comprises an exposure value detection section 87. The same reference numerals are given to the same components as in the first to fifth embodiments, and repetitive description thereof will not be performed. The exposure value detection section 87 detects an exposure value in a live view image displayed on the rear surface display section 22 or the EVF panel 59. Specifically, the exposure value detection section 87 calculates the exposure value on the basis of an imaging signal when the solid-state imaging element 21 captures a live view image.

In this embodiment, the main body controller 50 functions as a flash light emission controller that controls light emission of the flash device 17. The main body controller 50 reads out accessory information from a storage section, and determines display setting items on the basis of the extracted imaging conditions. Then, in a case where an exposure value that is equal to or larger than a predetermined value is detected by the exposure value detection section 87, the main body controller 50 changes the exposure value to a setting value for reducing the quantity of light emission of the flash device 17, and in a case where an exposure value that is smaller than the predetermined value is detected by the exposure value detection section 87 is detected, the main body controller 50 changes the exposure to a setting value for increasing the quantity of light emission of the flash device 17. Except for a processing procedure for determining the setting value, this embodiment is similar to the above-described respective embodiments.

In the sixth embodiment, in a case where there the intensity of flash light emission is adjusted in a plurality of setting items for setting an imaging function as a setting menu, it is preferable to give priority to the quantity of light emission of the flash device 17 depending on a setting value for adjustment of the intensity of flash light emission. Further, in a case where the setting value for adjustment of the intensity of flash light emission is set, it is preferable to turn off the function of the exposure value detection section 87. Alternatively, only in a case where a setting value of AUTO is present in adjustment of the intensity of flash light emission, in a similar way to the sixth embodiment, the quantity of light emission of the flash device 17 may be automatically changed in accordance with the exposure value detected by the exposure value detection section 87.

As a modification example of the sixth embodiment, the main body controller 50 may not control the quantity of light emission of the flash device 17, but instead, may control ON and OFF thereof. That is, in a case where an exposure value that is equal to or larger than a predetermined value is detected by the exposure value detection section 87, the main body controller 50 changes the exposure value to a setting value for turning off the light emission of the flash device 17, and in a case where an exposure value that is smaller than the predetermined value is detected by the exposure value detection section 87, the main body controller 50 changes the exposure value to a setting value for turning on the light emission of the flash device 17.

As another modification example, the main body controller 50 comprises the exposure value detection section 87 and the face image detection section 82 that is the same as in the fifth embodiment. In a case where a face image is detected by the face image detection section 82 and an exposure value that is equal to or larger than a predetermined value is detected by the exposure value detection section 87, the main body controller 50 changes the exposure value to a setting value for turning off the quantity of light emission of the flash device 17, and in a case where a face image is detected by the face image detection section 82 and an exposure value that is smaller than the predetermined value is detected by the exposure value detection section 87, the main body controller 50 changes the exposure value to a setting value for turning on the quantity of light emission of the flash device 17.

As still another modification example, the main body controller 50 comprises a distance calculation section instead of the exposure value detection section 87, and the face image detection section 82 that is the same as in the fifth embodiment. The distance calculation section calculates a distance value to a subject in a live view image displayed on the rear surface display section 22 or the EVF panel 59. A configuration for calculating the distance value to the subject is the same as in a configuration provided in the related art camera. For example, the distance value to the subject is calculated on the basis of an in-focus position of the focus lens 39 determined by the main body controller 50. In a case where a face image is not detected by the face image detection section 82 and a distance value that is equal to or larger than a predetermined value is detected by the distance calculation section, the main body controller 50 changes the distance value to a setting value for turning off the quantity of light emission of the flash device 17, and in a case where a face image is not detected by the face image detection section 82 and a distance value that is smaller than the predetermined value is detected by the distance calculation section, the main body controller 50 changes the distance value to a setting value for turning on the quantity of light emission of the flash device 17.

Seventh Embodiment

In a seventh embodiment to be described hereinafter, with respect to a specific first setting item among a plurality of display setting items displayed in a setting menu, a setting value is determined on the basis of imaging conditions included in accessory information extracted by an accessory information extraction section, and with respect to a second setting item relating to the first setting item, a setting value is determined on the basis of imaging conditions included in accessory information corresponding to the setting value determined with respect to the first setting item.

In a case of this embodiment, a configuration in which the setting value is determined with respect to the specific first setting item is the same as the configurations in which setting values of display setting items in the first to sixth embodiments are determined.

In this embodiment, as shown in an example shown in FIG. 23, an imaging scene is the first setting item, and a flash mode is the second setting item relating to the imaging scene. As a relationship between the first setting item and the second setting item, for example, an item that is most frequently changed as a set together with the first setting item among a plurality of display setting items displayed in a setting menu is set as the second setting item.

In the example shown in FIG. 23, the main body controller 50 determines a setting value most frequently used in imaging in a specific time slot as a setting value of the first setting item. Further, in determining a setting value with respect to the second setting item relating to the first setting item, the main body controller 50 determines the setting value on the basis of imaging conditions corresponding to the most frequently used setting value determined in the first setting item. That is, a setting value of the flash mode (the second setting item) is determined on the basis of imaging conditions corresponding to a landscape that is the most frequently used setting value of the imaging scene (the first setting item). Among the imaging conditions corresponding to the landscape, a setting value that is the most frequently used in the flash mode (the second setting item) is AUTO. Accordingly, the setting value of the second setting item is determined as AUTO.

In the above-described respective embodiments, a mirrorless single-lens type digital camera is shown as an example, but the invention may be applied to an interchangeable lens type digital camera such as a single-lens reflex type digital camera, or may be applied to a lens-integrated type digital camera in which a camera main body and a lens barrel are integrally provided.

EXPLANATION OF REFERENCES

10: interchangeable lens type digital camera
11: camera main body
12: interchangeable lens
13: power source lever
14: release switch
15: exposure correction dial
16: shutter speed/ISO sensitivity dial
17: built-in flash device
18: flash lever
19: mount
19A: body side signal contact 21: solid-state imaging element
22: rear surface display section
23: operating button
24: finder section
24A: finder eyepiece window
25: lens barrel
26: imaging optical system
27: focus ring
28: stop operating ring
29: zoom ring
30: lens mount
30A: lens side signal contact
31: lens controller
32: motor driver
33, 34: motor
36: zoom mechanism
37, 38: sensor
39: focus lens
40: variable magnification lens
41: stop unit
41a: stop leaf blade
50: main body controller
50A: timer
51: shutter unit
52: motor driver
53: image memory
54: image data processing section
55: AF processing section
56: LCD driver
57: card I/F
58: accessory information storage section
59: EVF panel
60: busline
62: shutter motor
63: memory card
71: camera main body
72: communication I/F
73: network
74: online storage
76: camera main body
77: GPS signal receiving section
81: camera main body
82: face image detection section
86: camera main body
87: exposure value detection section
M, M1, M2: setting menu

What is claimed is:

1. An imaging device comprising:
an image sensor that captures a subject image;
a memory;
a display screen; and
a processor, configured to:
  read out a plurality of captured images stored in the memory and captured by the image sensor and accessory information that is attached to the plurality of captured images and includes an imaging condition and an imaging time point;
  display a setting menu for setting an imaging function of the image sensor on the display screen;
  extract the accessory information including the imaging time point in a specific time slot from a plurality of pieces of the read-out accessory information; and
  change the setting menu in accordance with the number of changes of the imaging condition in the specific time slot on a basis of the extracted accessory information.

2. The imaging device according to claim 1,
wherein the processor displays a plurality of display setting items selected from a plurality of setting items corresponding to the imaging condition as the setting menu on the display screen, and
wherein the processor changes the display setting item to be displayed as the setting menu in accordance with the imaging condition included in the extracted accessory information.

3. The imaging device according to claim 2, wherein the processor is further configured to:
acquire a current time point,
wherein the specific time slot is a time slot including the acquired current time point.

4. The imaging device according to claim 3,
wherein the specific time slot is a time slot within a predetermined time range before and after the current time point, including the acquired current time point.

5. The imaging device according to claim 3, wherein the processor is further configured to:
determine whether the acquired current time point is a daytime slot or a nighttime slot,
wherein the specific time slot is any one of the determined daytime slot or the determined nighttime slot.

6. The imaging device according to claim 3, wherein the processor is further configured to:
determine whether the acquired current time point is a daytime slot or a nighttime slot,
wherein the specific time slot is a time slot within a predetermined time range including the acquired current time point, and is a time slot included in any one of the determined daytime slot or the determined nighttime slot.

7. The imaging device according to claim 3, wherein the processor is further configured to:
determine whether the acquired current time point is a daytime slot or a nighttime slot,
wherein the processor extracts the accessory information including the imaging time point in any one time slot of the determined daytime slot or the determined nighttime slot in a case where the accessory information including the imaging time point in the specific time slot is not present.

8. The imaging device according to claim 3, wherein the processor is further configured to:
acquire position information on a current position,
wherein the processor extracts the accessory information relating to the acquired position information in a case where the accessory information including the imaging time point in the specific time slot is not present.

9. The imaging device according to claim 3, wherein the processor is further configured to:
detect a face image from the subject image captured by the image sensor,
wherein the processor extracts the accessory information relating to person imaging in a case where the accessory information including the imaging time point in the specific time slot is not present and the face image is detected, and extracts the accessory information relating to non-person imaging in a case where the accessory information including the imaging time point in the specific time slot is not present and the face image is not detected.

10. The imaging device according to claim 2,
wherein the processor counts the number of changes of the imaging condition used in imaging in the specific time slot for each display setting item on the basis of the imaging condition included in the extracted accessory information, and displays the display setting items in a descending order of the numbers of changes.

11. The imaging device according to claim 10, wherein the processor is further configured to:
determine setting values of the plurality of display setting items, and determines values most frequently used in the display setting items as the setting values, on the basis of the imaging condition included in the extracted accessory information.

12. The imaging device according to claim 3, wherein the processor is further configured to:
detect an exposure value in the subject image captured by the image sensor;
control, in a case where there is a flash device that irradiates a subject with illumination light, light emission of the flash device; and
change, in a case where an exposure value that is equal to or larger than a predetermined value is detected, the exposure value to a setting value for reducing the quantity of light emission of the flash device, and change, in a case where an exposure value that is smaller than the predetermined value is detected, the exposure value to a setting value for increasing the quantity of light emission of the flash device.

13. The imaging device according to claim 3, wherein the processor is further configured to:
detect an exposure value in the subject image captured by the image sensor;
control, in a case where there is a flash device that irradiates a subject with illumination light, light emission of the flash device; and
change, in a case where an exposure value that is equal to or larger than a predetermined value is detected, the exposure value to a setting value for turning off light emission of the flash device, and change, in a case where an exposure value that is smaller than the predetermined value is detected, the exposure value to a setting value for turning on light emission of the flash device.

14. The imaging device according to claim 9, wherein the processor is further configured to:
detect an exposure value in the subject image captured by the image sensor;
control, in a case where there is a flash device that irradiates a subject with illumination light, light emission of the flash device; and
change, in a case where the face image is detected and an exposure value that is equal to or larger than a predetermined value is detected, the exposure value to a setting value for turning off light emission of the flash device, and change, in a case where the face image is detected and an exposure value that is smaller than the predetermined value is detected, the exposure value to a setting value for turning on light emission of the flash device.

15. The imaging device according to claim 9, wherein the processor is further configured to:
calculate a distance value to a subject in the subject image captured by the image sensor;
control, in a case where there is a flash device that irradiates a subject with illumination light, light emission of the flash device; and
change, in a case where the face image is not detected and a distance value that is equal to or larger than a predetermined value is detected, the distance value to a setting value for turning off light emission of the flash device, and change, in a case where the face image is not detected and a distance value that is smaller than the predetermined value is detected, the distance value to a setting value for turning on light emission of the flash device.

16. The imaging device according to claim 11, wherein the processor determines a setting value with respect to a specific first setting item among the plurality of display setting items on the basis of the imaging condition included in the extracted accessory information, and determines a setting value with respect to a second setting item relating to the first setting item among the plurality of display setting items different from the first setting item on the basis of the imaging condition included in the accessory information corresponding to the setting value determined with respect to the first setting item.

17. The imaging device according to claim 1, wherein in a case where there is a plurality of the memories, the processor re-arranges the accessory information that is extracted as the accessory information including the imaging time point in the specific time slot in a time series manner.

18. The imaging device according to claim 17, wherein the processor changes the setting menu in accordance with a plurality of pieces of the accessory information used in imaging in a predetermined period, among the plurality of pieces of the accessory information that are re-arranged in a time series manner.

19. The imaging device according to claim 1, wherein the accessory information is formed of EXIF format data.

20. An imaging device control method of an image device having an image sensor, a memory, and a display screen, comprising:
reading out a plurality of captured images stored in the memory and captured by the image sensor and accessory information that is attached to the plurality of captured images and includes an imaging condition and an imaging time point;
displaying a setting menu for setting an imaging function of the image sensor on the display screen;
extracting the accessory information including the imaging time point in a specific time slot from a plurality of pieces of the accessory information; and
changing the setting menu in accordance with the number of changes of the imaging condition on a basis of the accessory information including the imaging time point in the specific time slot.

* * * * *